US008448068B2

(12) United States Patent
Negi

(10) Patent No.: US 8,448,068 B2
(45) Date of Patent: May 21, 2013

(54) INFORMATION PROCESSING APPARATUS, INFORMATION PROCESSING METHOD, PROGRAM, AND STORAGE MEDIUM

(75) Inventor: Daisuke Negi, Tokyo (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 11/903,146

(22) Filed: Sep. 20, 2007

(65) Prior Publication Data

US 2008/0082921 A1 Apr. 3, 2008

(30) Foreign Application Priority Data

Sep. 21, 2006 (JP) ................................. 2006-255798

(51) Int. Cl.
*G06F 3/00* (2006.01)
(52) U.S. Cl.
USPC ........................................................ 715/721
(58) Field of Classification Search
USPC .................. 715/738, 739, 744, 745, 720, 721
See application file for complete search history.

(56) References Cited

U.S. PATENT DOCUMENTS

| 6,667,751 | B1 * | 12/2003 | Wynn et al. ................... 715/833 |
| 2003/0046307 | A1 * | 3/2003 | Rivette et al. ............... 707/104.1 |
| 2005/0216581 | A1 * | 9/2005 | Blumenau et al. ............ 709/223 |
| 2006/0064716 | A1 * | 3/2006 | Sull et al. ........................ 725/37 |
| 2008/0288536 | A1 * | 11/2008 | Pfeiffer et al. ............. 707/104.1 |

FOREIGN PATENT DOCUMENTS

| JP | 10-304267 | 11/1998 |
| JP | 2002-199348 A | 7/2002 |
| JP | 2003-264783 A | 9/2003 |
| JP | 2004-193871 A | 7/2004 |
| JP | 2005-033714 A | 2/2005 |
| JP | 2005-260818 A | 9/2005 |

\* cited by examiner

*Primary Examiner* — Thanh Vu
(74) *Attorney, Agent, or Firm* — Wolf, Greenfield & Sacks, P.C.

(57) ABSTRACT

An information processing apparatus includes recording means for recording content, playback controlling means for controlling playback of the recorded content, and viewing history generating means for generating viewing history data used for displaying a viewing history of the content that is played back. Information concerning the content, a title identifying the content, and an image relating to the content are displayed in the viewing history.

16 Claims, 14 Drawing Sheets

INFORMATION PROCESSING APPARATUS, INFORMATION PROCESSING METHOD, PROGRAM, AND STORAGE MEDIUM

CROSS REFERENCES TO RELATED APPLICATIONS

The present invention contains subject matter related to Japanese Patent Application JP 2006-255798 filed in the Japanese Patent Office on Sep. 21, 2006, the entire contents of which are incorporated herein by reference.

BACKGROUND OF THE INVENTION

1. Field of the Invention

The present invention relates to information processing apparatuses, information processing methods, programs, and storage media. Particularly, the present invention relates to an information processing apparatus, an information processing method, a program, and a storage medium, which are capable of easily reminding a user of content which the user viewed in the past.

2. Description of the Related Art

Hitherto, some recording-playback apparatuses, which record and play back programs, have functions of generating thumbnail images representative of some scenes in the recorded programs and displaying lists of the generated thumbnail images (for example, Japanese Unexamined Patent Application Publication No. 2002-199348).

Since a list of thumbnail images is created for every recorded program in such recording-playback apparatuses, users can view the lists to understand the content of the recorded programs to some extent. Accordingly, the users can select desired programs from the recorded programs to view the selected programs. Time information concerning the scenes indicated by the thumbnail images is also displayed in each list as additional information.

Some systems using the Internet to deliver programs display the dates when the programs were viewed, the titles of the programs, and the charges for the programs in the terminals of customers as viewing history so that the customers can confirm the reception times of the programs which the customers have viewed and the charges for the programs (for example, Japanese Unexamined Patent Application Publication No. 2005-260818).

SUMMARY OF THE INVENTION

Users are sometimes reminded of which pieces of content the users was viewed or sometimes enjoy talking with friends about the pieces of content which the users viewed. However, since presentation of the information concerning the viewed pieces of content to users is not considered in the above technologies, there are cases in which the users cannot be reminded of the pieces of content, for example, the content of programs which the users were viewed.

In other words, although users can view the lists of the thumbnail images to understand the content of the recorded programs to some extent, it is necessary for the users to search for the list of the thumbnail images of a program which the users want to view from among a vast number of lists because the lists for all the recorded programs are created in the recording-playback apparatuses.

Since the content of a program which customers viewed is not displayed in the viewing history displayed in the terminals of the customers, it is difficult for the customers to be reminded of the content of the program only by viewing the title of the program and the date when the programs was viewed.

Accordingly, it is desirable to easily remind a user of content which the user viewed in the past.

According to an embodiment of the present invention, an information processing apparatus includes recording means for recording content; playback controlling means for controlling playback of the recorded content; and viewing history generating means for generating viewing history data used for displaying a viewing history of the content that is played back, information concerning the content, a title identifying the content, and an image relating to the content being displayed in the viewing history.

The information processing apparatus may further include retrieving means for retrieving at least one viewing history meeting a predetermined condition, among viewing histories displayed on the basis of other pieces of viewing history data that have been generated, as another viewing history relating to the viewing history. The viewing history generating means may generate the viewing history data so that information concerning the retrieved other viewing history is displayed in the viewing history.

The information processing apparatus may further include retrieving means for retrieving at least one viewing history meeting a predetermined condition, among viewing histories displayed on the basis of other pieces of viewing history data that have been generated, as another viewing history relating to the viewing history and updating means for updating the other pieces of viewing history data so that information concerning the viewing history is displayed in the other viewing history retrieved by the retrieving means.

The information processing apparatus may further include digest moving image generating means for recompressing moving image data used for playing back a predetermined segment of the content to generate a digest moving image of the content. An image that is displayed in the viewing history and that relates to the content may be a thumbnail image indicating the content of the digest moving image.

The information processing apparatus may further include comment creating means for creating a comment of a user about the content by combining a word associated with the content with a word representing an impression about the content, the words being selected by the user. The viewing history generating means may generate the viewing history data so as to display the comment in the viewing history.

The information processing apparatus may further include uploading means for uploading the generated viewing history data to another apparatus connected to the information processing apparatus via a communication network as data used for displaying the viewing history at a predetermined position in a Web page.

According to another embodiment of the present invention, an information processing method includes the steps of controlling recording of content; controlling playback of the recorded content; and generating viewing history data used for displaying a viewing history of the content that is played back, information concerning the content, a title identifying the content, and an image relating to the content being displayed in the viewing history.

According to another embodiment of the present invention, a program causes a computer to execute the steps of controlling recording of content; controlling playback of the recorded content; and generating viewing history data used for displaying a viewing history of the content that is played back, information concerning the content, a title identifying the content, and an image relating to the content being displayed in the viewing history.

According to the embodiments of the present invention, content is recorded, playback of the recorded content is controlled, and viewing history data used for displaying a viewing history of the content that is played back is generated. Information concerning the content, a title identifying the content, and an image relating to the content are displayed in the viewing history.

According to the present invention, it is possible to display a viewing history concerning content that was viewed. Particularly, it is possible to remind a user of content which the user viewed.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 1:
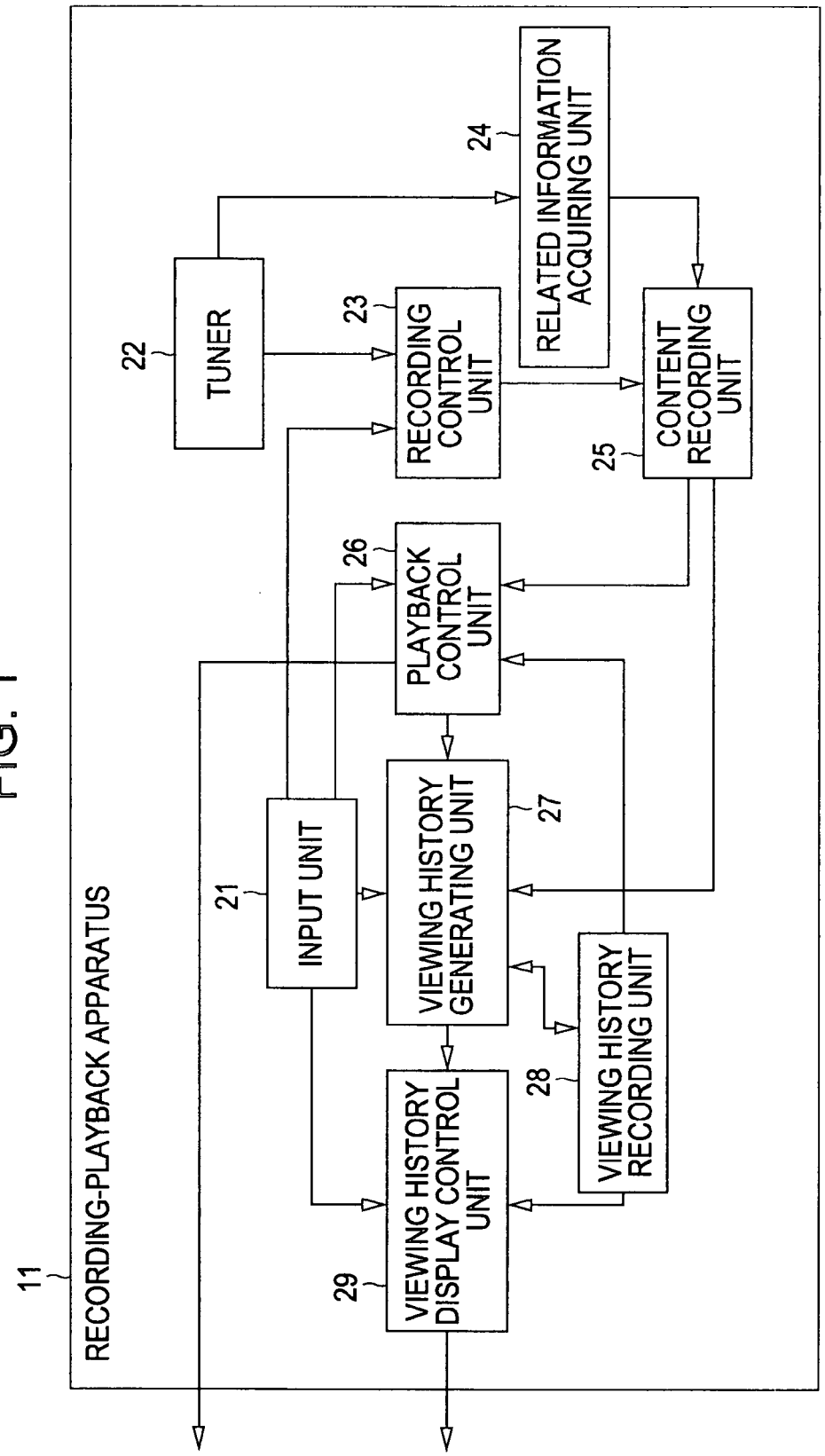
FIG. 1 is a block diagram showing an example of the configuration of a recording-playback apparatus according to an embodiment of the present invention.
Figure 2:
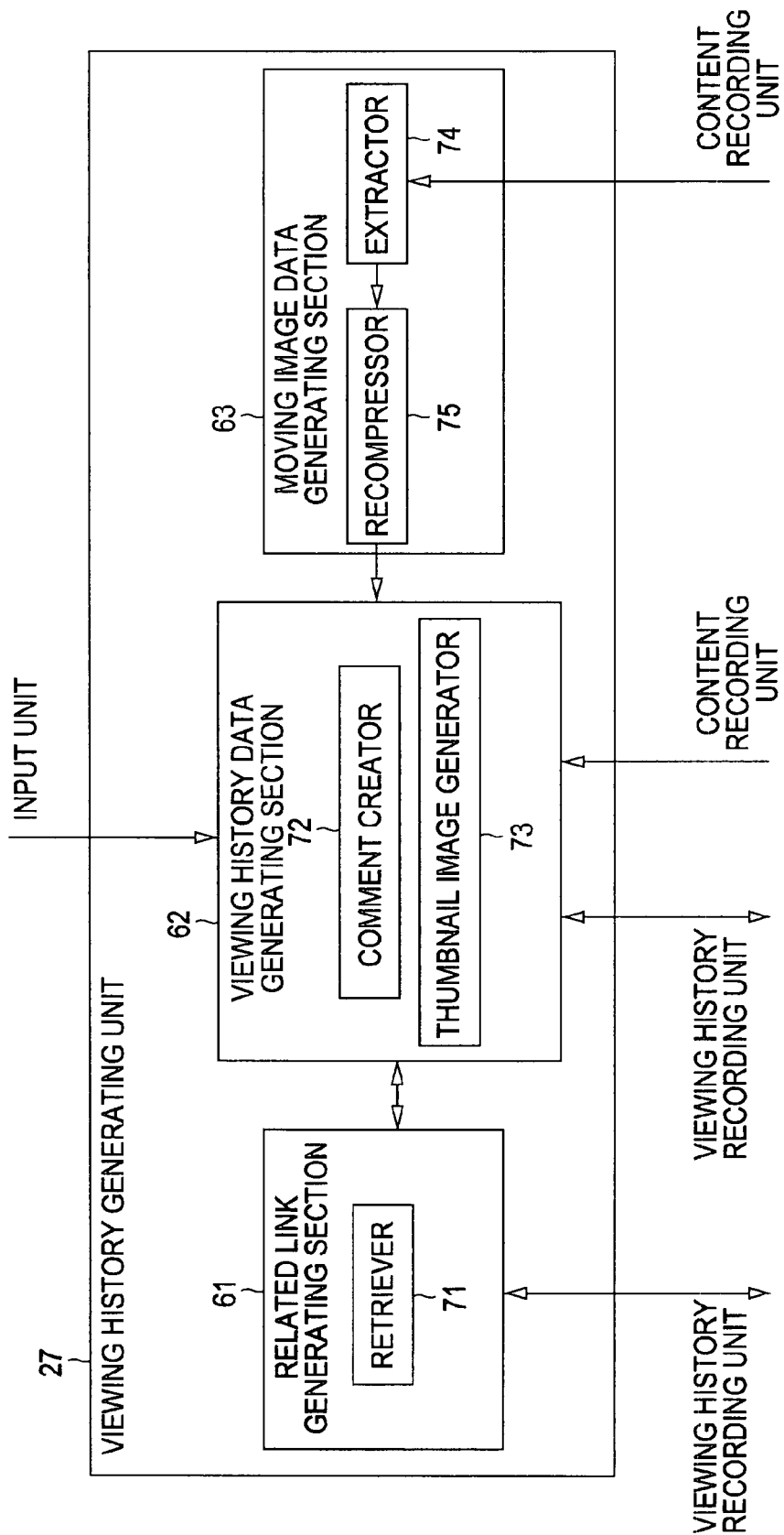
FIG. 2 is a block diagram showing an example of the configuration of a viewing history generating unit shown in FIG. 1 in detail.

An information processing apparatus according to an embodiment of the present invention includes recording means (for example, a content recording unit 25 in FIG. 1) for recording content; playback controlling means (for example, a playback control unit 26 in FIG. 1) for controlling playback of the recorded content; and viewing history generating means (for example, a viewing history data generating section 62 in FIG. 2) for generating viewing history data used for displaying a viewing history of the content that is played back, information concerning the content, a title identifying the content, and an image relating to the content being displayed in the viewing history.

The information processing apparatus may further include retrieving means (for example, a retriever 71 in FIG. 2) for retrieving at least one viewing history meeting a predetermined condition, among viewing histories displayed on the basis of other pieces of viewing history data that have been generated, as another viewing history relating to the viewing history. The viewing history generating means may generate the viewing history data so that information concerning the retrieved other viewing history is displayed in the viewing history (for example, Step S79 in FIG. 6).

The information processing apparatus may further include retrieving means (for example, the retriever 71 in FIG. 2) for retrieving at least one viewing history meeting a predetermined condition, among viewing histories displayed on the basis of other pieces of viewing history data that have been generated, as another viewing history relating to the viewing history and updating means (for example, a related link generating section 61 in FIG. 2) for updating the other pieces of viewing history data so that information concerning the viewing history is displayed in the other viewing history retrieved by the retrieving means.

The information processing apparatus may further include digest moving image generating means (for example, a moving image data generating section 63 in FIG. 2) for recompressing moving image data used for playing back a predetermined segment of the content to generate a digest moving image of the content. An image that is displayed in the viewing history and that relates to the content may be a thumbnail image indicating the content of the digest moving image.

The information processing apparatus may further include comment creating means (for example, a comment creator 72 in FIG. 2) for creating a comment of a user about the content by combining a word associated with the content with a word representing an impression about the content, the words being selected by the user. The viewing history generating means may generate the viewing history data so as to display the comment in the viewing history (for example, Step S79 in FIG. 6).

Figure 12:
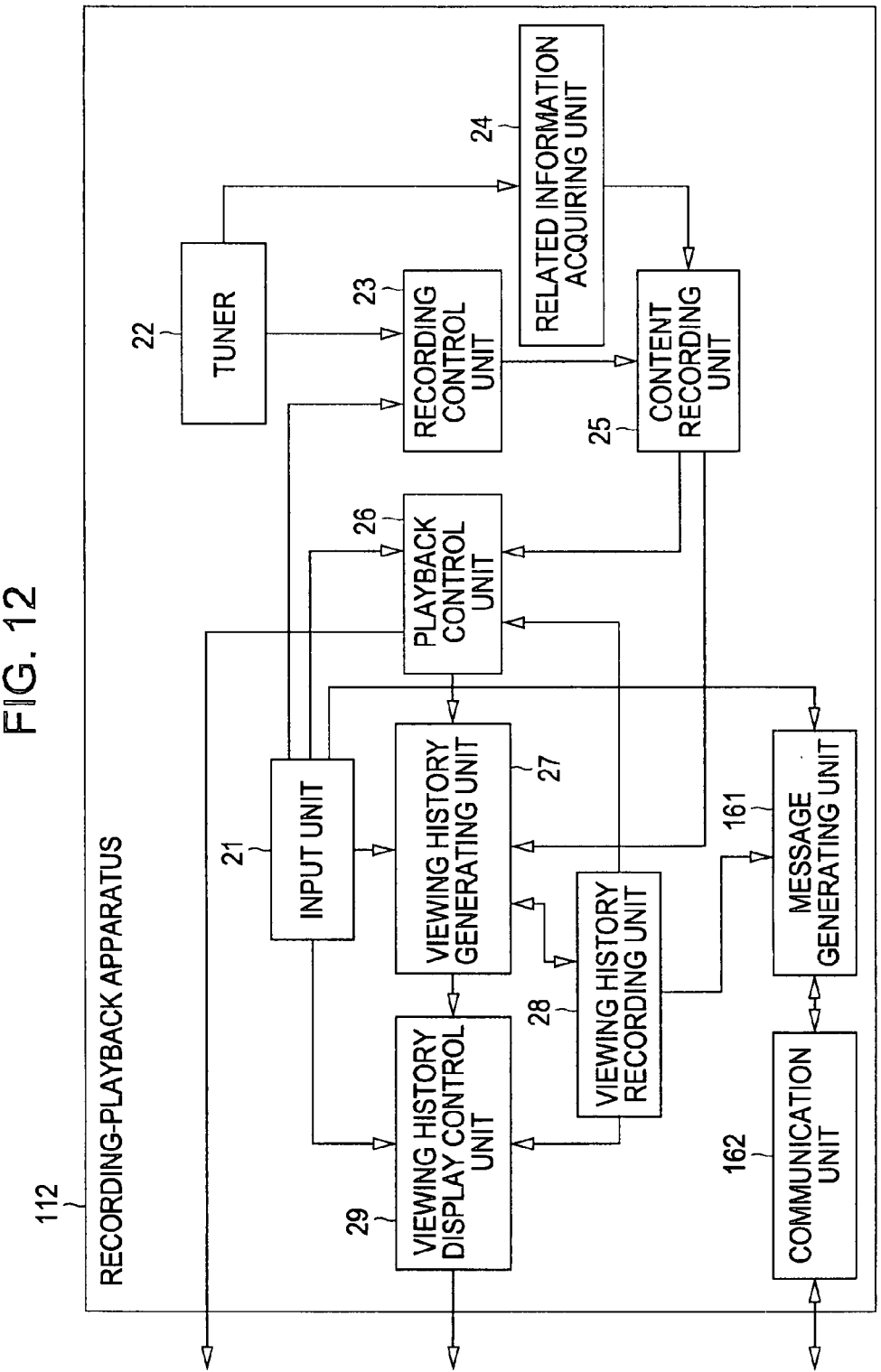
FIG. 12 is a block diagram showing an example of the configuration of a recording-playback apparatus according to another embodiment of the present invention.

The information processing apparatus may further include uploading means (for example, a message generating unit 161 and a communication unit 162 in FIG. 12) for uploading the generated viewing history data to another apparatus connected to the information processing apparatus via a communication network as data used for displaying the viewing history at a predetermined position in a Web page.

Figure 5:
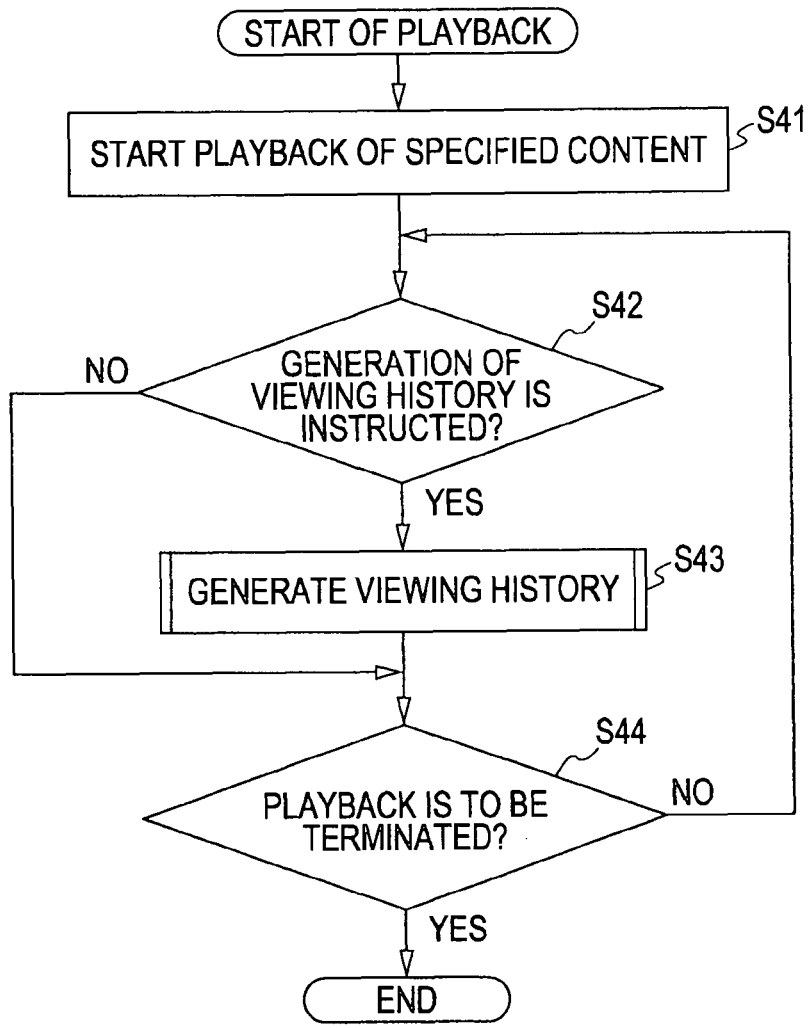
FIG. 5 is a flowchart showing an example of a playback process.
Figure 6:
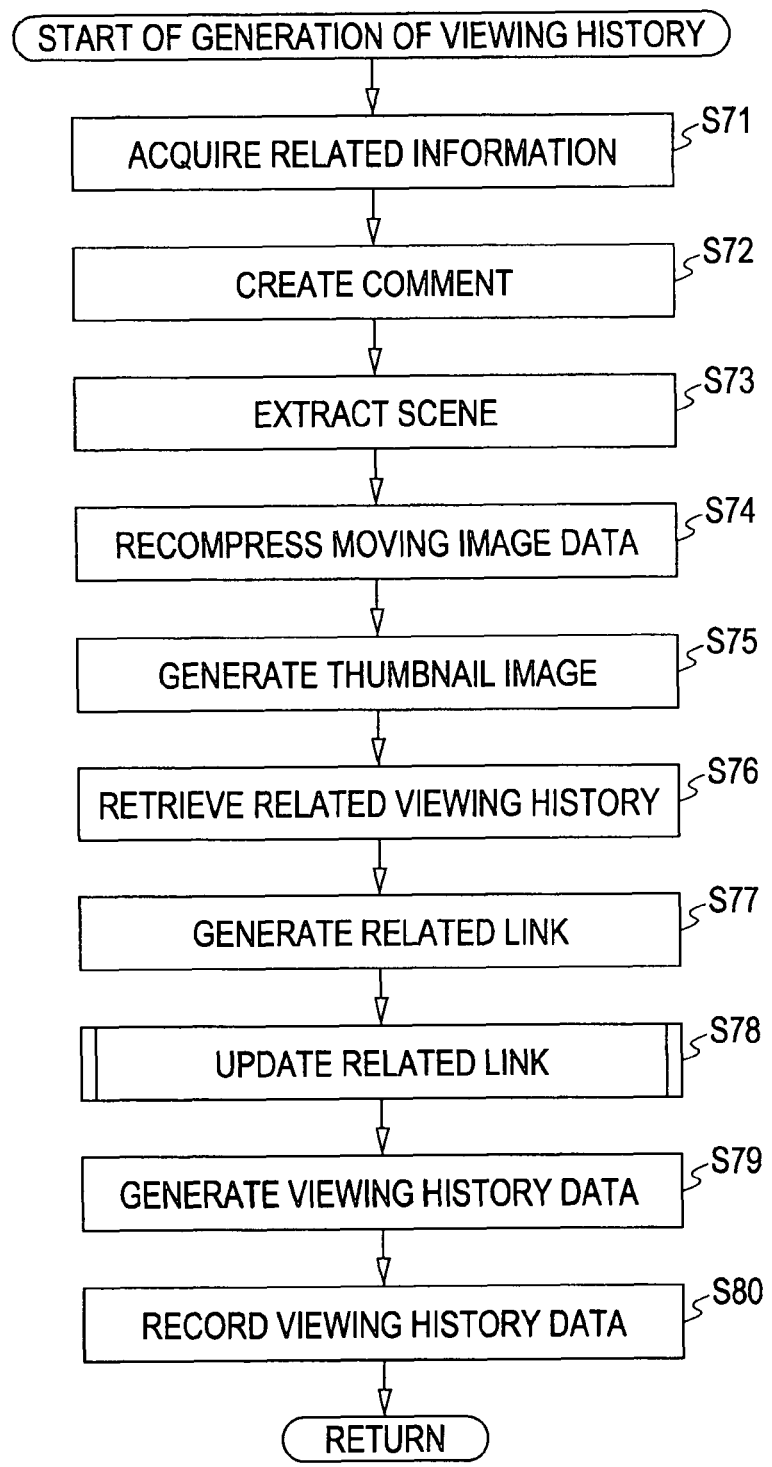
FIG. 6 is a flowchart showing an example of a viewing history generating process.

An information processing method according to another embodiment of the present invention includes the steps of controlling recording of content (for example, Step S12 in FIG. 4); controlling playback of the recorded content (for example, Step S41 in FIG. 5); and generating viewing history data used for displaying a viewing history of the content that is played back, information concerning the content, a title identifying the content, and an image relating to the content being displayed in the viewing history (for example, Step S79 in FIG. 6).

A program according to another embodiment of the present invention causes a computer to execute the steps of controlling recording of content (for example, Step S12 in FIG. 4); controlling playback of the recorded content (for example, Step S41 in FIG. 5); and generating viewing history data used for displaying a viewing history of the content that is played back, information concerning the content, a title identifying the content, and an image relating to the content being displayed in the viewing history (for example, Step S79 in FIG. 6).

Embodiments of the present invention will now be described with reference to the attached drawings.

FIG. 1 is a block diagram showing an example of the configuration of a recording-playback apparatus according to an embodiment of the present invention.

Referring to FIG. 1, a recording-playback apparatus 11 records a TV broadcast program as a piece of content viewed by a user and plays back the recorded TV broadcast program. The recording-playback apparatus 11 includes an input unit 21, a tuner 22, a recording control unit 23, a related information acquiring unit 24, a content recording unit 25, a playback control unit 26, a viewing history generating unit 27, a viewing history recording unit 28, and a viewing history display control unit 29.

The input unit 21 includes a receiving unit that receives commands from buttons or a remote commander. The input unit 21 supplies a signal corresponding to a user's operation to the recording control unit 23, the playback control unit 26, the viewing history generating unit 27, and the viewing history display control unit 29.

The tuner 22 receives a broadcast signal used for playing back a program from a broadcast station (not shown) and supplies the received broadcast signal to the recording control unit 23. The tuner 22 acquires related information concerning the program, which is a piece of content, from the received broadcast signal and supplies the related information to the related information acquiring unit 24. The related information indicates, for example, the content of the program and the broadcast schedule of the program. For example, the tuner 22 acquires Electronic Program Guide (EPG) from the broadcast signal as the related information.

The recording control unit 23 supplies the broadcast signal supplied from the tuner 22 to the content recording unit 25 in response to a signal instructing recording of a program, received from the input unit 21, and the broadcast signal is recorded in the content recording unit 25. The related information acquiring unit 24 acquires the related information from the tuner 22 and supplies the acquired related information to the content recording unit 25. The related information is recorded in the content recording unit 25. The related information acquiring unit 24 may acquire the related information, for example, Internet EPG (iEPG) from another apparatus connected to the recording-playback apparatus 11 via a communication network, such as the Internet.

The content recording unit 25 is, for example, a hard disk. The content recording unit 25 records the broadcast signal supplied from the recording control unit 23 and the related information supplied from the related information acquiring unit 24. The broadcast signal used for playing back a program is hereinafter appropriately referred to as content data. The content recording unit 25 supplies the recorded content data and related information to the playback control unit 26 and the viewing history generating unit 27.

The playback control unit 26 controls playback of content. Specifically, the playback control unit 26 decompresses the content data supplied from the content recording unit 25 in a predetermined format and supplies the decompressed content data to a display device (not shown) where the content data is displayed.

The playback control unit 26 also decompresses a digest moving image, more particularly, digest moving image data used for displaying the digest moving image, supplied from the viewing history recording unit 28 in a predetermined format and supplies the digest moving image data to the display device where the digest moving image is displayed. The digest moving image means a moving image during a predetermined interval of content recorded in the content recording unit 25. The digest moving image is extracted from the content so that a user can understand the content or a predetermined scene in the content in a short time.

The playback control unit 26 supplies the related information supplied from the content recording unit 25 to the display device (not shown) where the related information is displayed.

The viewing history generating unit 27 uses the content data and the related information supplied from the content recording unit 25 to generate a viewing history, which is a history of a piece of content which the user viewed. Information concerning one piece of content that is recorded in the recording-playback apparatus 11 and that was viewed by the user, for example, information introducing the content is displayed in one viewing history.

The viewing history generating unit 27 uses the content data supplied from the content recording unit 25 to generate a digest moving image of the content played back by using the content data and supplies the generated digest moving image to the viewing history recording unit 28.

The viewing history recording unit 28 is, for example, a hard disk. The viewing history recording unit 28 records the viewing history and the digest moving image supplied from the viewing history generating unit 27. The viewing history recording unit 28 supplies the recorded viewing history to the viewing history display control unit 29 and supplies the recorded digest moving image to the playback control unit 26. The viewing history display control unit 29 supplies the viewing history supplied from the viewing history recording unit 28 to the display device (not shown) where the viewing history is displayed.

FIG. 2 is a block diagram showing an example of the configuration of the viewing history generating unit 27 shown in FIG. 1 in detail.

The viewing history generating unit 27 includes a related link generating section 61, a viewing history data generating section 62, and a moving image data generating section 63.

The related link generating section 61 generates a related link indicating another viewing history relating to the viewing history of the viewed content. The related link generating section 61 includes a retriever 71 that retrieves, from the viewing histories recorded in the viewing history recording unit 28, another viewing history relating to the viewing history to be generated. The related link generating section 61 generates the information indicating the viewing history resulting from the retrieval by the retriever 71 as the related link and supplies the generated related link to the viewing history data generating section 62.

The viewing history data generating section 62 uses the content data and the related information supplied from the content recording unit 25, the related link supplied from the related link generating section 61, and the digest moving image supplied from the moving image data generating section 63 to generate viewing history data used for displaying the viewing history. The viewing history data generating section 62 includes a comment creator 72 and a thumbnail image generator 73.

The comment creator 72 creates a comment, such as an impression of the user about the viewed content, on the basis of the signal supplied from the input unit 21. The thumbnail image generator 73 uses the content data supplied from the content recording unit 25 or the digest moving image data supplied from the moving image data generating section 63 to generate a thumbnail image indicating the content or the content of the digest moving image.

The viewing history data generating section 62 generates viewing history data concerning the viewing history in which the related link supplied from the related link generating section 61, the comment created by the comment creator 72, and the thumbnail image generated by the thumbnail image generator 73 are to be displayed. The viewing history data generating section 62 supplies the generated viewing history data and the digest moving image data supplied the moving image data generating section 63 to the viewing history recording unit 28 where the viewing history data and the digest moving image data are recorded. Specifically, the viewing history data includes related information concerning the content introduced in the viewing history as metadata.

The moving image data generating section 63 uses the content data supplied from the content recording unit 25 to generate digest moving image data. The moving image data generating section 63 includes an extractor 74 and a recompressor 75.

The extractor 74 extracts moving image data during an interval during which the digest moving image is to be generated from the content data supplied from the content recording unit 25 and supplies the extracted moving image data to the recompressor 75. The recompressor 75 recompresses the moving image data supplied from the extractor 74 in a predetermined format to generate digest moving image data and supplies the generated digest moving image data to the viewing history data generating section 62.

If the user instructs generation of the viewing history of the content which is recorded in the recording-playback apparatus 11 and which the user is playing back and viewing, the recording-playback apparatus 11 generates the viewing history of the content, more particularly, the viewing history data concerning the viewing history and records the generated viewing history data. If the user operates the recording-playback apparatus 11 to instruct display of the viewing history, the recording-playback apparatus 11 displays, for example, a viewing history shown in FIG. 3, in the display device connected to the recording-playback apparatus 11.

Figure 3:
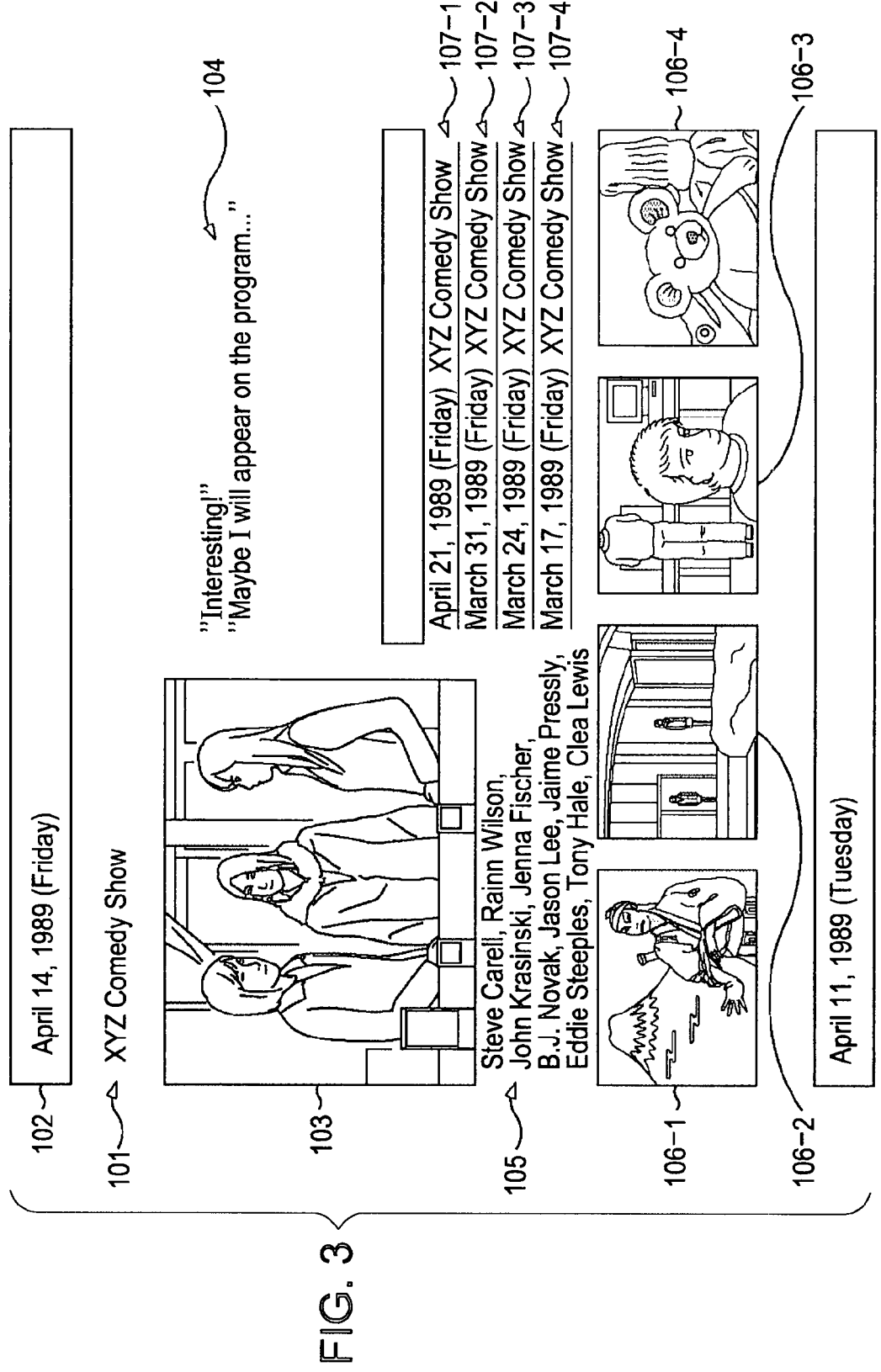
FIG. 3 illustrates an example of a viewing history.

The example in FIG. 3 has one viewing history displayed therein. A title 101 identifying the content introduced in the viewing history is displayed in the viewing history. In the example in FIG. 3, the title 101 reads "XYZ Comedy Show". Although the title 101 indicates the name of the content, that is, the name of the program, included in the related information recorded in the content recording unit 25, the user may input the title 101.

A viewed date 102 indicating the date and the day of week when the content introduced in the viewing history was viewed is displayed above the title 101. A thumbnail image 103 introducing the content and a comment 104 of the user about the content are displayed below the title 101.

Specifically, a text "Apr. 14, 1989 (Friday)" indicating the date and the day of week when the content was viewed is displayed as the viewed date 102. A text "Interesting! Maybe I will appear on the program . . . " indicating the comment of the user about the content is displayed as the comment 104. The viewed date 102 may indicate the date when the content was recorded.

Information 105 concerning the content is displayed below the thumbnail image 103. Referring to FIG. 3, the names of performers "Steve Carell, Rainn Wilson, John Krasinski, Jenna Fischer, B. J. Novak, Jason Lee, Jaime Pressly, Eddie Steeples, Tony Hale, Clea Lewis" are displayed as the information 105 concerning the content. The information 105 concerning the content is not limited to the names of the performers and may indicate a time when the content is broadcasted, the name of a broadcast station of the content, or a text introducing the content.

Thumbnail images 106-1 to 106-4 indicating the content of the digest moving images of the content introduced in the viewing history are displayed in the lower part of the viewing history in FIG. 3. Each of the digest moving images indicated by the thumbnail images 106-1 to 106-4 is a moving image during a predetermined interval of the content indicated by the thumbnail image 103, resulting from the recompression.

The thumbnail images 106-1 to 106-4 may be thumbnail images indicating the content of scenes constituting the one digest moving image. The thumbnail images 106-1 to 106-4 are not limited to the thumbnail images of the digest moving images and may be any images related to content. For example, the thumbnail images 106-1 to 106-4 may indicate the content of the scenes constituting the content or may be other pieces of the content relating to the content, for example, thumbnail images indicating pieces of content indicated by related links 107-1 to 107-4.

The user can view the thumbnail images 106-1 to 106-4 to be visually reminded of the content.

The related links 107-1 to 107-4 indicating the viewing histories of other pieces of content relating to the content introduced in the viewing history are displayed on the right side of the information 105 concerning the content. For example, a text "Apr. 21, 1989 (Friday) XYZ Comedy Show" indicating the title of the related content and the date when the related content was viewed is displayed as the related link 107-1.

The related links 107-1 to 107-4 are displayed in a predetermined order from the top to the bottom. For example, the related links 107-1 to 107-4 are displayed in the descending order of the degrees of relevance of the pieces of content having the viewing histories indicated by the related links to the content introduced in the displayed viewing history or in the reverse order of the dates when the pieces of content was viewed. For example, if the related links are displayed in the descending order of the degrees of relevance from the top to the bottom, the content having the viewing history indicated by the related link 107-1 has the highest degree of relevance to the content introduced in the displayed viewing history.

When any of the related links 107-1 to 107-4 is selected by the user, the viewing history currently displayed in the display device is switched to the viewing history of the content indicated by the selected related link.

When it is not necessary to discriminate between the thumbnail images 106-1 to 106-4 in the following description, the thumbnail images 106-1 to 106-4 are collectively referred to as a thumbnail image 106. When it is not necessary to discriminate between the related links 107-1 to 107-4, the related links 107-1 to 107-4 are collectively referred to as a related link 107.

The title 101 and/or comment 104 displayed in the viewing history may be edited and updated by the user after the viewing history is generated.

Processes performed by the recording-playback apparatus 11 in order to generate the viewing history shown in FIG. 3 will now be described.

Figure 4:
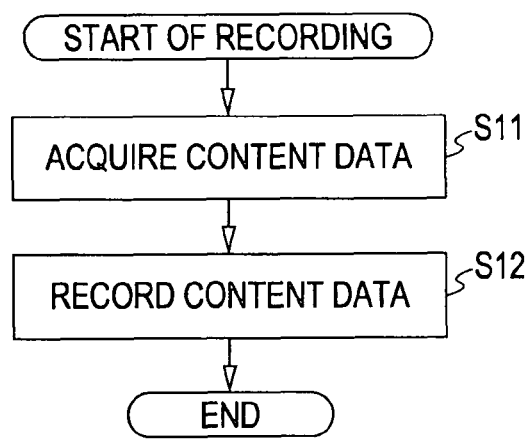
FIG. 4 is a flowchart showing an example of a recording process.

FIG. 4 is a flowchart showing an example of a recording process performed when the user instructs the recording-playback apparatus 11 to record content. The recording process is started when a signal instructing recording of content in response to a user's operation is supplied from the input unit 21 to the recording control unit 23.

In Step S11, the recording control unit 23 acquires content data concerning the content the recording of which is instructed from the tuner 22 in response to the signal instructing recording of the content from the input unit 21. Specifically, the tuner 22 receives a broadcast signal as the content data, transmitted from a broadcast station, and the recording control unit 23 acquires the broadcast signal from the tuner 22. The recording control unit 23 supplies the acquired content data to the content recording unit 25.

In Step S12, the content recording unit 25 records the content data supplied from the recording control unit 23 and the recording process is terminated.

As described above, the content data concerning the content the recording of which is instructed by the user is acquired and recorded in the content recording unit 25. The content recording unit 25 records the related information supplied from the related information acquiring unit 24, in addition to the recording process. Specifically, each time the related information included in the broadcast signal as the content data received by the tuner 22 is updated, the related information acquiring unit 24 acquires the updated related information from the tuner 22 and supplies the acquired related information to the content recording unit 25 where the related information is recorded.

After the content is recorded in the content recording unit 25, the user can play back the recorded content to view the content. When the user operates the recording-playback apparatus 11 or the remote commander to specify a piece of content to be viewed and to instruct playback of the specified content, a signal instructing the playback of the content is supplied from the input unit 21 to the playback control unit 26 in response to the user's operation. The recording-playback apparatus 11 starts a playback process to play back the specified content.

FIG. 5 is a flowchart showing an example of the playback process performed by the recording-playback apparatus 11.

In Step S41, the playback control unit 26 starts playback of the specified content in response to a signal instructing playback of the content supplied from the input unit 21. Specifically, the playback control unit 26 acquires content data concerning the specified content from the content recording unit 25, decompresses the acquired content according to, for example, Moving Pictures Experts Group (MPEG), and supplies the decompressed content data to the display device connected to the recording-playback apparatus 11 to display the content in the display device. The playback control unit 26 continues to decompress the content data and display the content in the display device until the playback of the content is terminated or until termination of the playback is instructed.

In Step S42, the viewing history data generating section 62 in the viewing history generating unit 27 determines whether generation of a viewing history is instructed on the basis of the signal supplied from the input unit 21.

For example, in order to instruct the generation of a viewing history of the content that is being viewed by the user, the user operates the remote commander for the recording-playback apparatus 11 to display a menu screen in the display device. Then, the user operates the remote commander so as to select an item on the menu screen to instruct the generation of a viewing history. The remote commander transmits a command instructing the generation of a viewing history to the input unit 21, which is a receiving unit.

The input unit 21 receives the command from the remote commander and supplies a signal instructing the generation of a viewing history to the viewing history data generating section 62. The viewing history data generating section 62 determines that the generation of a viewing history is instructed if the signal instructing the generation of a viewing history is supplied from the input unit 21.

Alternatively, the remoter commander may include a button used for instructing the generation of a viewing history. When the button is pressed by the user, the command instructing the generation of a viewing history may be transmitted from the remote commander to the recording-playback apparatus 11.

If the viewing history data generating section 62 determines in Step S42 that the generation of a viewing history is not instructed, the process skips Step S43 and goes to Step S44 because a viewing history is not to be generated.

If the viewing history data generating section 62 determines in Step S42 that the generation of a viewing history is instructed, the process goes to Step S43 to perform a viewing history generating process described below in detail. In the viewing history generating process, a viewing history introducing the content being viewed by the user is generated and recorded.

If the viewing history data generating section 62 determines in Step S42 that the generation of a viewing history is not instructed or after the viewing history generating process is performed in Step S43, then in Step S44, the playback control unit 26 determines whether the playback of the content is to be terminated.

The playback control unit 26 determines that the playback of the content is to be terminated if the content is played back to the end or if a signal instructing termination of the playback is supplied from the input unit 21 to the playback control unit 26 in response to a user's operation.

If the playback control unit 26 determines in step S44 that the playback of the content is not to be terminated, the process goes back to Step S42 and repeats the above steps until the playback control unit 26 determines that the playback of the content is to be terminated. If the playback control unit 26 determines in Step S44 that the playback of the content is to be terminated, the playback control unit 26 stops the supply of the content data to the display device and the playback process is terminated.

As described above, the recording-playback apparatus 11 plays back a piece of content in response to an instruction from the user to play back the piece of content recorded in the content recording unit 25 and displays the piece of content in the display device. The recording-playback apparatus 11 generates a viewing history of a piece of content being played back in response to an instruction from the user to generate the viewing history of the piece of content and records the generated viewing history.

FIG. 6 is a flowchart showing an example of the viewing history generating process corresponding to Step S43 in FIG. 5.

In Step S71, the viewing history data generating section 62 acquires related information concerning the content for which the generation of the viewing history is instructed from the content recording unit 25. For example, the EPG is recorded in the content recording unit 25 as the related information and the viewing history data generating section 62 acquires information concerning the content being played back from the EPG as the related information concerning the content. The related information is not limited to the EPG and may be the iEPG or other information.

In Step S72, the comment creator 72 in the viewing history data generating section 62 creates a comment, such as an impression of the user about the content, on the basis of the signal supplied from the input unit 21. For example, when the user instructs generation of a viewing history, the playback control unit 26 displays a screen on which a comment, such as an impression about the content, is input in the display device and the user operates the remote commander to input a comment by using a function, such as a software keyboard. The remote commander transmits a command instructing reception of the input comment to the input unit 21, which is the receiving unit, and the input unit 21 receives the transmitted command. The input unit 21 supplies a signal indicating the comment input by the user to the viewing history data generating section 62 on the basis of the received command. The comment creator 72 in the viewing history data generating section 62 creates the input comment, more particularly, data used for displaying the input comment on the basis of the signal supplied from the input unit 21.

In Step S73, the extractor 74 in the moving image data generating section 63 acquires the content being played back from the content recording unit 25 and extracts scenes constituting the digest moving image from the acquired content.

For example, the extractor 74 acquires the content being played back, more particularly, content data concerning the content being played back from the content recording unit 25. The extractor 74 uses the acquired content data to detect switching between the scenes constituting the content.

Specifically, the extractor 74 divides the image on a frame constituting the content into predetermined segments to calculate the sum of the luminance values of pixels in each segment. The extractor 74 draws a histogram indicating the distribution of the sums of the luminance values of the segments included in the image on the frame on the basis of the sum of the luminance values calculated for every segment to yield a feature value of the image on the frame on the basis of the histogram. After yielding the feature value of the image on each frame, the extractor 74 calculates a difference between the feature value of the image on the frame and the feature value of the image on a temporally preceding frame for every frame constituting the content. The extractor 74 determines the image on the frame to be the image on the first frame in the scene included in the content if the calculated difference is larger than a predetermined threshold.

Accordingly, the frames from a frame whose difference is larger than the predetermined threshold to a frame immediately preceding the next frame whose difference is larger than the predetermined threshold form one scene.

Next, the extractor 74 yields the feature values of the scenes constituting the content. The feature value of each scene is calculated on the basis of, for example, the number of pixels of a predetermined color in the frames in each scene, the volume of a sound associated with the moving image as the content, or the magnitude of a motion vector in the frames in each scene.

The extractor 74 extracts some scenes important for the user to understand the content from the scenes constituting the content on the basis of the yielded feature values of the scenes and determines the extracted scenes to be the scenes constituting the digest moving image. For example, the extractor 74 extracts scenes whose feature values are larger than a predetermined threshold from the scenes constituting the content as the scenes constituting the digest moving image.

One extracted scene may constitute one digest moving image or a moving image including some continuous or discontinuous scenes may constitute one digest moving image. Furthermore, part of one extracted scene, for example, a partial scene corresponding to a few seconds from the beginning may constitute one digest moving image.

For example, yielding the feature values of scenes on the basis of the number of pixels of flesh color can extract a scene in which a person appears on a large scale. Yielding the feature values of scenes on the basis of the magnitude of the motion vector can extract a scene in which the angle of view of the image is varied due to panning or zooming.

After extracting the scenes constituting the digest moving image from the content, the extractor 74 supplies part of the content data used for playing back the extracted scene to the recompressor 75 as the moving image data for the digest moving image data.

Referring back to FIG. 6, in Step S74, the recompressor 75 recompresses the moving image data supplied from the extractor 74 in a predetermined format, for example, MPEG-2. For example, the recompressor 75 temporarily decompresses the moving image data, performs image conversion or decimation to the decompressed moving image data so as to reduce the size of the moving image data, that is, the size of the frame if necessary or so as to reduce the number of pixels in the digest moving image, and recompresses the moving image data in a predetermined format. The recompressor 75 supplies the digest moving image data resulting from the recompression to the viewing history data generating section 62.

The moving image supplied from the extractor 74 to the recompressor 75 may be supplied to the viewing history data generating section 62 as the digest moving image without the recompression.

In Step S75, the thumbnail image generator 73 in the viewing history data generating section 62 uses the digest moving image data supplied from the recompressor 75 and the content data concerning the content which is recorded in the content recording unit 25 and of which the viewing history is to be generated to generate a thumbnail image indicating the digest moving image and the content.

For example, the thumbnail image generator 73 generates a thumbnail image on the basis of the digest moving image data supplied from the recompressor 75 so that the first image in each digest moving image or the image a few minutes after the first image is used as the thumbnail image. As a result, for example, the thumbnail image 106 shown in FIG. 3 is generated.

For example, the thumbnail image generator 73 generates a thumbnail image on the basis of the content data acquired from the content recording unit 25 so that the first image in the content is used as the thumbnail image indicating the content. As a result, for example, the thumbnail image 103 shown in FIG. 3 is generated.

In Step S76, the retriever 71 in the related link generating section 61 retrieves viewing histories relating to the viewing history to be generated, that is, the viewing histories of pieces of content relating to the content for which generation of the viewing history is instructed.

For example, the retriever 71 retrieves viewing histories meeting a predetermined condition from the generated viewing histories as the viewing histories relating to the viewing history to be generated. For example, viewing histories including a predetermined keyword or viewing histories of the pieces of content having the same title are retrieved here. Specifically, the retriever 71 retrieves viewing history data including as the related information a predetermined word(s), such as the names of the performers or the title of the content, included in the related information acquired by the viewing history data generating section 62 in Step S71 from the viewing history data recorded in the viewing history recording unit 28 and determines the viewing histories in the retrieved viewing history data to be the viewing histories relating to the viewing history to be generated. In other words, the related information concerning the content is included in the generated viewing history data, and the viewing history data including as the related information a word included in the related information concerning the content for which generation of the viewing history is instructed is retrieved from the generated viewing history data.

In Step S77, the related link generating section 61 generates information indicating the viewing history retrieved by the retriever 71 as the related link and supplies the generated related link to the viewing history data generating section 62. For example, the information generated as the related link includes information that is used for displaying the date when the content introduced in the viewing history was viewed and the title of the content and that indicates a position in the viewing history recording unit 28 where the viewing history data concerning the viewing history is recorded.

A predetermined number of related links may be generated in the descending order of the degrees of relevance to the viewing history to be generated.

In Step S78, the related link generating section 61 performs a related link updating process described below in detail. In the related link updating process, the related link generating section 61 updates the related link to be displayed in the viewing histories that relate to the viewing history to be generated and that have been recorded in the viewing history recording unit 28.

In Step S79, the viewing history data generating section 62 uses the related link supplied from the related link generating section 61, the thumbnail image generated by the thumbnail image generator 73, the comment created by the comment creator 72, and the related information concerning the content acquired from the content recording unit 25 to generate viewing history data. For example, the viewing history data generating section 62 generates viewing history data, for example, so that the title 101 identifying the content, the viewed date 102, the thumbnail image 103, the comment 104, the information 105 concerning the content, the thumbnail image 106 of the digest moving image, and the related link 107 are displayed in the viewing history introducing the content, as shown in FIG. 3. After generating the viewing history data, the viewing history data generating section 62 supplies the generated viewing history data and the digest moving image data supplied from the recompressor 75 to the viewing history recording unit 28.

In Step S80, the viewing history recording unit 28 associates the viewing history data supplied from the viewing history data generating section 62 with the digest moving image data supplied therefrom and records the viewing history data associated with the digest moving image data. Then, the process goes to Step S44 in FIG. 5.

The recording-playback apparatus 11 generates the viewing history data concerning the viewing history in which the title of the viewed content, the viewed date, the comment, the information concerning the content, the thumbnail images, and the related links are displayed in the manner described above.

As described above, the generation of the viewing history data concerning the viewing history in which the title of the viewed content, the viewed date, the comment, the information concerning the content, the thumbnail images, and the related links are displayed allows the viewing history to be displayed so that the user can be reminded of the content which the user viewed. Accordingly, the user can view the viewing history to be reminded of the content which the user viewed.

Since the related links to the viewing histories relating to the generated viewing history are displayed, the user can view not only the displayed viewing history but also other viewing histories relating to the displayed viewing history. Accordingly, the user can be reminded of the pieces of content which the user viewed.

Since the digest moving images associated with the generated viewing history are generated and recorded in the viewing history recording unit 28, the digest moving images are not deleted even if the user deletes the content recorded in the content recording unit 25. Accordingly, the user can play back the digest moving images along with the viewing history and, therefore, can be reminded of the pieces of content which the user viewed.

Figure 7:
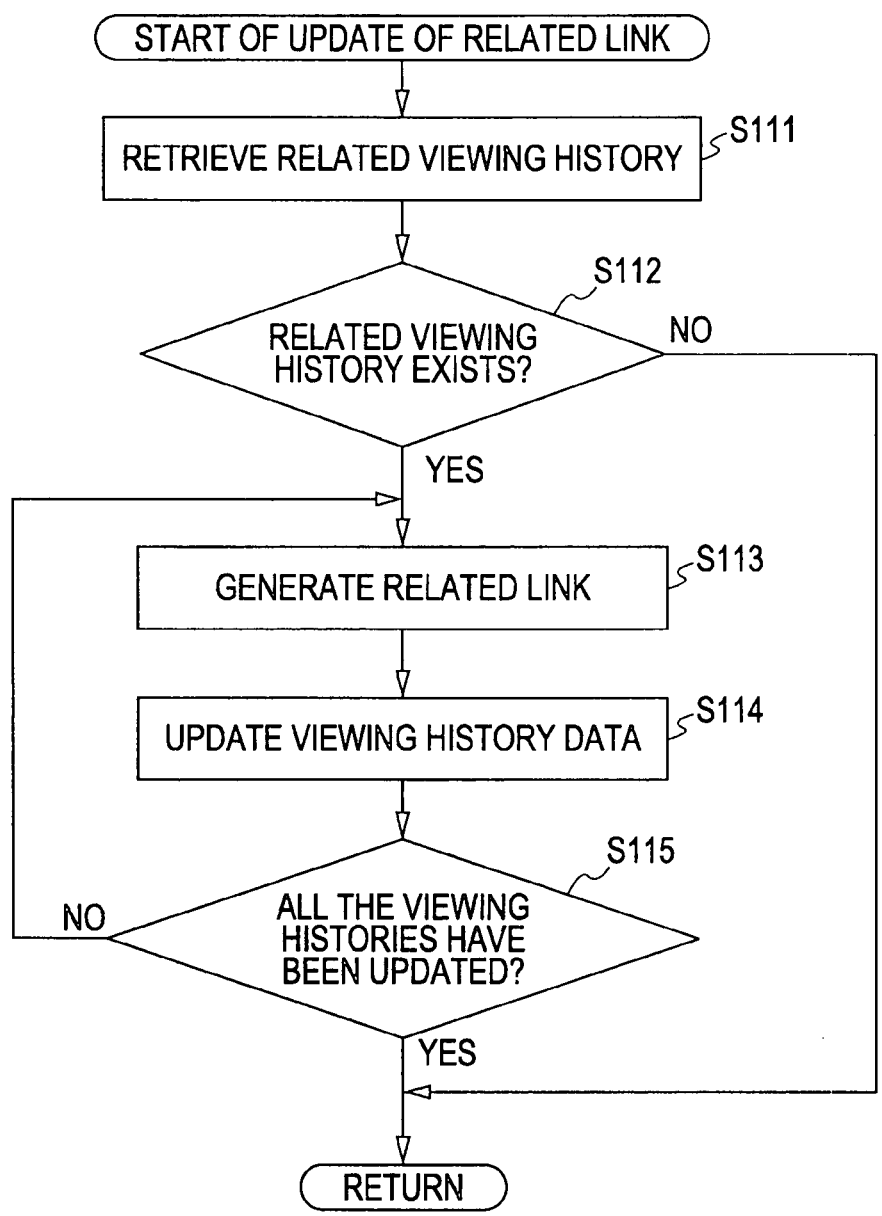
FIG. 7 is a flowchart showing an example of a related link updating process.

FIG. 7 is a flowchart showing an example of the related link updating process corresponding to Step S78 in FIG. 6.

In Step S111, the retriever 71 in the related link generating section 61 retrieves viewing histories relating to the viewing history to be generated. For example, the retriever 71 retrieves the viewing histories meeting a predetermined condition, such as the viewing histories including a predetermined keyword or the viewing histories of the pieces of content having the same title, from the generated viewing histories as the viewing histories relating to the viewing history to be generated.

Specifically, the retriever 71 retrieves viewing history data including as the related information a predetermined word(s), such as the names of the performers or the title of the content, included in the related information acquired in Step S71 in FIG. 6 from the viewing history data recorded in the viewing history recording unit 28 and determines the viewing histories in the retrieved viewing history data to be the viewing histories relating to the viewing history to be generated.

In Step S112, the related link generating section 61 determines whether any viewing history relating to the viewing history to be generated exists on the basis of the retrieval result by the retriever 71. If the related link generating section 61 determines that any viewing history relating to the viewing history to be generated does not exist, the process skips Steps S113 to S115 to goes to Step S79 in FIG. 6 because the related links in other viewing histories are not updated.

If the related link generating section 61 determines in Step S112 that any viewing history relating to the viewing history to be generated exists, the process goes to Step S113. In Step S113, the related link generating section 61 generates information indicating the viewing history to be generated, that is, the viewing history of which the user instructs generation as the related link.

In Step S114, the related link generating section 61 selects one viewing history relating to the retrieved viewing history, that is, the viewing history of which the user instructs the generation and updates the viewing history data concerning the selected viewing history. Specifically, the related link generating section 61 updates the viewing history data recorded in the viewing history recording unit 28 so that the information indicating the viewing history to be generated is to be displayed as the related link in the selected viewing history.

As a result, for example, if the viewing history shown in FIG. 3 is retrieved as the viewing history relating to the viewing history to be generated, the viewing history data concerning the viewing history is updated so that the related link 107-1 indicating the viewing history to be generated is displayed in the retrieved viewing history.

In the example in FIG. 3, the viewed date 102 when the viewing history retrieved as the related viewing history was viewed reads "Apr. 14, 1989" while the viewed date shown in the related link 107-1 reads "Apr. 21, 1989". The viewed date indicated by the related link 107-1 is more recent than the viewed date indicated by the viewed date 102, that is, is nearer to the current date. Accordingly, the generated viewing history is updated to display the related links indicating the viewing histories that relate to the updated viewing history and that were generated after the updated viewing history.

Referring back to FIG. 7, after the viewing history data is updated, in Step S115, the related link generating section 61 determines whether the viewing history data concerning all the retrieved viewing histories has been updated. If the related link generating section 61 determines that the viewing history data concerning all the retrieved viewing histories has not been updated, the process goes back to Step S113 to update the subsequent viewing history data.

If the related link generating section 61 determines that the viewing history data concerning all the retrieved viewing histories has been updated, the process goes to Step S79 in FIG. 6.

The recording-playback apparatus 11 retrieves the viewing histories relating to the viewing history to be generated from the viewing histories that have been generated and recorded and updates the viewing history data concerning the related viewing histories so that the related link indicating the viewing history to be generated is to be displayed in the viewing histories resulting from the retrieval in the manner described above.

As described above, updating the viewing history data concerning the viewing histories relating to the viewing history to be generated, among the recorded viewing histories, allows the related links indicating other related viewing histories that were subsequently generated to be displayed in all the viewing histories. Accordingly, the user can know the related viewing histories that were generated after the viewing history being viewed and can enjoy viewing the viewing histories more.

Although the viewing histories relating to the viewing history to be generated are retrieved in Step S111 and the viewing history data concerning the retrieved viewing histories is updated in the above description, the viewing history data concerning the viewing histories retrieved in Step 76 in FIG. 6 may be updated.

Specifically, the viewing histories retrieved in Step S76 relate to the viewing history to be generated and the related links indicating the retrieved viewing histories are displayed in the viewing history to be generated. Accordingly, updating the viewing history data so that the related link indicating the viewing history to be generated is to be displayed in the retrieved viewing histories allows the retrieved viewing histories to be associated with the viewing history to be generated. In other words, the related links indicating the retrieved viewing histories are to be displayed in the viewing history to be generated, and the related link indicating the viewing history to be generated is to be displayed in the retrieved viewing histories. Consequently, it is possible to select a certain related link from the viewing history to be generated to display the viewing history of the selected related link, and it is also possible to display the related link indicating the viewing history to be generated in the viewing histories relating to the viewing history to be generated.

Although the related links are updated each time a new viewing history is generated in the above description, the related links may be updated after a predetermined time elapsed since the related links have been recently updated. In such a case, the related link generating section 61 retrieves viewing histories relating to the viewing histories generated after the related links have been recently updated and updates the related links indicating the retrieved viewing histories.

As described above, after the viewing history data is generated and is recorded in the viewing history recording unit 28, the user can view the viewing history that is displayed. When the user views the viewing history, for example, the user operates the remote commander to display a menu screen in the display device connected to the recording-playback apparatus 11 and selects an item the viewing history of which is to be displayed from the menu screen.

When the user operates the remote commander to instruct display of the viewing history, the remote commander transmits a command corresponding to the user's operation to the input unit 21, which is the receiving unit. The input unit 21 receives the command from the remote commander and supplies a signal instructing the display of the viewing history to the viewing history display control unit 29.

When the signal instructing display of the viewing history is supplied from the input unit 21 to the viewing history display control unit 29, the recording-playback apparatus 11 starts a viewing history displaying process to display the viewing history in the display device.

Figure 8:
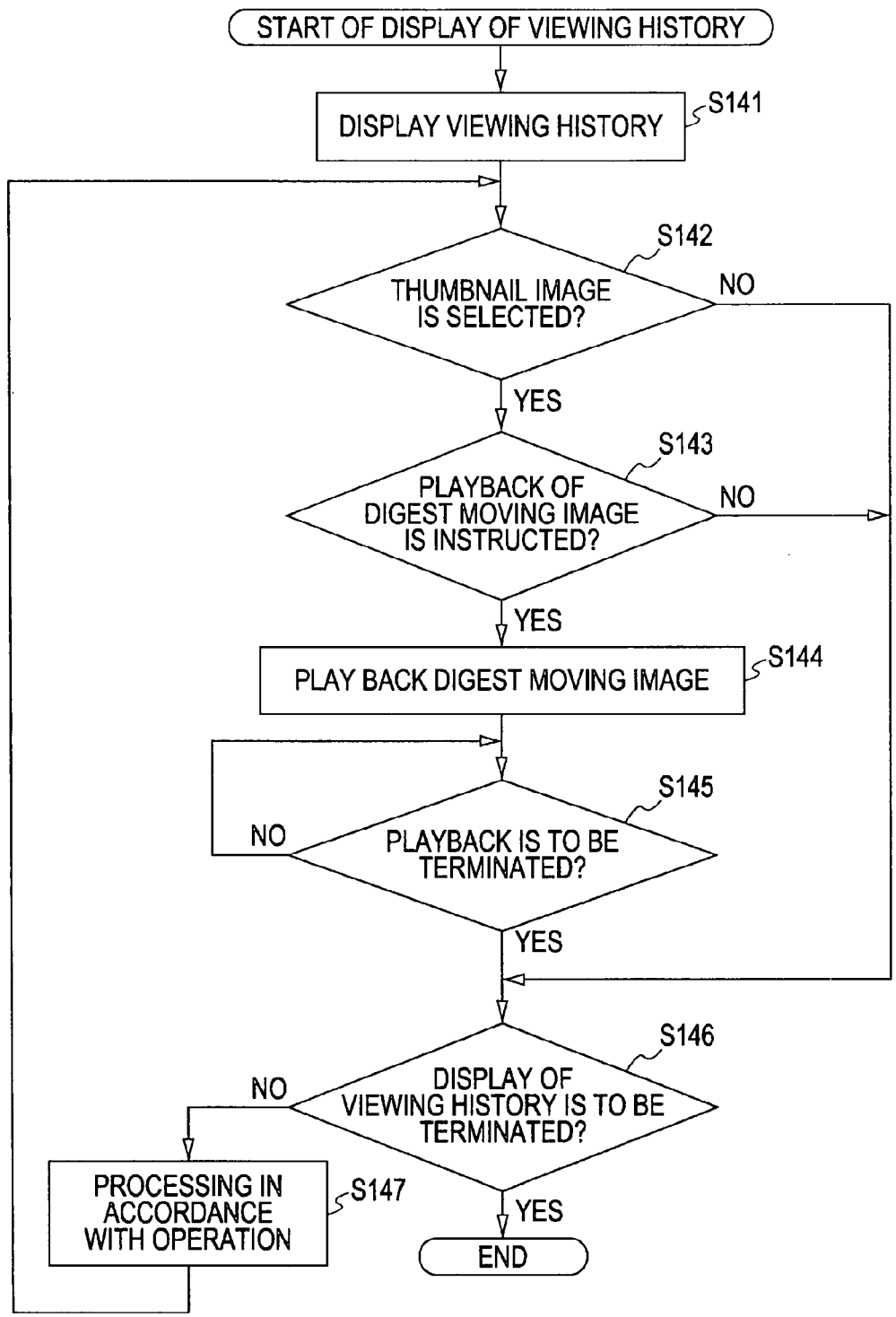
FIG. 8 is a flowchart showing an example of a viewing history displaying process.

FIG. 8 is a flowchart showing an example of the viewing history displaying process performed by the recording-playback apparatus 11.

In Step S141, the viewing history display control unit 29 displays the viewing history in response to the signal supplied from the input unit 21. Specifically, the viewing history display control unit 29 acquires the viewing history data used for displaying the viewing history from the viewing history recording unit 28 and supplies the acquired viewing history data to the display device where the viewing history data is displayed. For example, the viewing history display control unit 29 acquires a piece of viewing history data that has been generated most recently from the recorded pieces of viewing history data. The user may specify a viewing history and the viewing history display control unit 29 may acquire viewing history data concerning the viewing history specified by the user. For example, the viewing history shown in FIG. 3 is displayed in the display device.

In Step S142, the playback control unit 26 determines whether the thumbnail image indicating a digest moving image is selected.

For example, if the user operates the remote commander to select any of the thumbnail images 106-1 to 106-4 in the viewing history shown in FIG. 3, the remote commander transmits a command corresponding to the user's operation to the input unit 21. The input unit 21 receives the transmitted command and supplies a signal indicating that the thumbnail image 106 is selected to the playback control unit 26. The playback control unit 26 determines that the thumbnail image 106 is selected if the signal indicating that the thumbnail image 106 is selected is supplied from the input unit 21.

If the playback control unit 26 determines in Step S142 that any thumbnail image is not selected, the process skips Steps S143 to S145 to go to Step S146.

If the playback control unit 26 determines in Strep S142 that the thumbnail image is selected, then in Step S143, the playback control unit 26 determines whether playback of the digest moving image indicated by the selected thumbnail image is instructed.

For example, if the user wants to display the digest moving image indicated by the thumbnail image 106-1 in the viewing history shown in FIG. 3, the user selects the thumbnail image 106-1 and, then, presses a playback button (not shown) displayed in the viewing history or instructs playback of the digest moving image on a menu that is displayed. The remote commander transmits a command corresponding to the user's operation to the input unit 21. The input unit 21 supplies a signal instructing playback of the digest moving image to the playback control unit 26 in response to the command received from the remote commander. The playback control unit 26 determines that the playback of the digest moving image is instructed if the signal instructing the playback of the digest moving image is supplied from the input unit 21.

If the playback control unit 26 determines in Step S143 that the playback of the digest moving image is not instructed, the process skips Steps S144 and S145 to go to Step S146.

If the playback control unit 26 determines in Step S143 that the playback of the digest moving image is instructed, the process goes to Step S144. In Step S144, the playback control unit 26 plays back the digest moving image the playback of which is instructed in response to the signal instructing the playback of the digest moving image, supplied from the input unit 21. Specifically, the playback control unit 26 acquires digest moving image data concerning the digest moving image the playback of which is instructed, that is, digest moving image data concerning the digest moving image indicated by the selected thumbnail image 106, from the viewing history recording unit 28. The playback control unit 26 decompresses the acquired digest moving image data in a predetermined format and supplies the digest moving image data to the display device where the digest moving image data is displayed.

For example, the playback control unit 26 supplies the digest moving image data to the display device where the digest moving image is displayed on the entire screen thereof. The digest moving image need not be displayed on the entire screen of the display device and may be displayed on part of the screen of the display device. Or, the digest moving image may be displayed in the portion where the selected thumbnail image 106 is displayed in the viewing history in FIG. 3.

Alternatively, the digest moving image, instead of the thumbnail image of the digest moving image, may be repeatedly played back and displayed in the portion corresponding to the thumbnail image 106 in the viewing history in FIG. 3. If the displayed digest moving image is selected and the playback of the selected digest moving image is instructed, the selected digest moving image may be displayed on the entire screen of the display device.

Referring back to FIG. 8, after the digest moving image is played back, in Step S145, the playback control unit 26 determines whether the playback of the digest moving image being played back is to be terminated. For example, if the digest moving image has been played back to the end or if a signal instructing termination of the playback of the digest moving image is supplied from the input unit 21 in response to a user's operation, the playback control unit 26 determines that the playback of the digest moving image being played back is to be terminated.

If the playback control unit 26 determines in Step S145 that the playback of the digest moving image being played back is not to be terminated, the process goes back to Step S145 to repeat the determination until the playback control unit 26 determines that the playback of the digest moving image being played back is to be terminated. If the playback control unit 26 determines in Step S145 that the playback of the digest moving image being played back is to be terminated, the playback control unit 26 terminates the supply of the digest moving image data to the display device and the process goes to Step S146.

In Step S146, the viewing history display control unit 29 determines whether the display of the viewing history is to be terminated in response to the signal supplied from the input unit 21. If the viewing history display control unit 29 determines that the display of the viewing history is not to be terminated, the process goes to Step S147.

In Step S147, the recording-playback apparatus 11 performs processing in accordance with a user's operation and the process goes back to Step S142 to repeat the above steps. For example, if the user operates the remote commander to select the related link 107-1 in the viewing history in FIG. 3, the viewing history display control unit 29 acquires viewing history data concerning the viewing history indicated by the related link 107-1 from the viewing history recording unit 28 on the basis of the signal supplied from the input unit 21 and displays the viewing history based the acquired viewing history data in the display device.

If the viewing history display control unit 29 determines in Step S146 that the display of the viewing history is to be terminated, the viewing history display control unit 29 terminates the display of the viewing history and the viewing history displaying process is terminated.

The recording-playback apparatus 11 displays the viewing history in response to the user's operation and, if any thumbnail image displayed in the viewing history is selected and the playback of the digest moving image indicated by the selected thumbnail image is instructed, plays back and displays the digest moving image the playback of which is instructed in the manner described above.

As described above, displaying the viewing history and playing back the digest moving image the playback of which is instructed allows the user to be reminded of the content which the user viewed.

Although the user operates the remote commander to input a comment about the content in the above description, a keyboard may be connected to the recording-playback apparatus 11 as the input unit 21 and the user may use the keyboard to input a comment. Another apparatus may be connected to the recording-playback apparatus 11 and the recording-playback apparatus 11 may receive a comment input with the other apparatus.

As a comment about a content, the user may select a symbol or numerical value indicating the degree of interest in the content or may select a word or a combination of words from some predetermined words, such as "interesting", "boring", and "recommended", representing an impression about the content. In such a case, the comment creator 72 creates a comment including the symbol or numerical value selected by the user or the word representing the impression on the basis of the signal supplied from the input unit 21 in response to the user's operation.

In addition, as a comment about a content, the user may input a combination of a word or a combination of words associated with the content with a word or a combination of words representing an impression. In such a case, the viewing history data generating section 62 in the viewing history generating unit 27 extracts a word or a combination of words that is associated with the content and that is included in the related information acquired from the content recording unit 25 and displays the extracted word or combination of words in the display device via the viewing history display control unit 29. For example, part of a sentence describing the content or the performer in the content, such as "Steve's" or "Steve's group", is extracted. The viewing history display control unit 29 displays a word or a combination of words that are selected from predetermined words including "performance", "expression", "song", "fine", "uncool", and "disgusted", and that represent an impression in the display device.

The user selects a combination of the word or the combination of words associated with the content, displayed in the display device, with the word or the combination of words representing the impression to input a comment about the content, such as "the expression of Steve is uncool". The comment creator 72 creates a comment by combining the words selected by the user on the basis of the signal supplied from the input unit 21 in response to the user's operation.

A comment about the content may be created on the basis of a sentence corresponding to an operation, such as fast-forward, rewind, or stop, by the user during the playback of the content, for example, on the basis of a sentence, such as "viewed the content at one sitting", "skipped part of the content", or "viewed little or nothing of the content". For example, if the user instructs stop of the playback of the content being played back, the playback control unit 26 stops the playback of the content on the basis of the signal instructing the stop of the playback, supplied from the input unit 21 in response to the user's operation, and supplies a signal indicating that the stop of the playback is instructed to the comment creator 72 in the viewing history generating unit 27. The comment creator 72 creates a comment about the content by using a sentence, for example, "stopped the viewing of the content at some midpoint" or "viewed little or nothing of the content", associated in advance with the stop of the playback in response to the signal indicating that the stop of the playback is instructed, supplied from the playback control unit 26.

A comment about the content may be created by combining a sentence corresponding to a user's operation during the playback of the content with a predetermined word or a combination of predetermined words representing an impression.

Although the user instructs generation of the viewing history during the playback of the content in the above description, the user may instruct in advance the generation of the viewing history before playing back the content and may generate the viewing history after a predetermined time or more elapsed since the playback of the content has been started.

In such a case, the user operates the remote commander to instruct in advance the generation of the viewing history. When the user specifies a piece of content to be viewed and instructs the playback of the specified piece of content, the recording-playback apparatus 11 starts a playback process to play back the piece of content and generate a viewing history introducing the piece of content.

Figure 9:
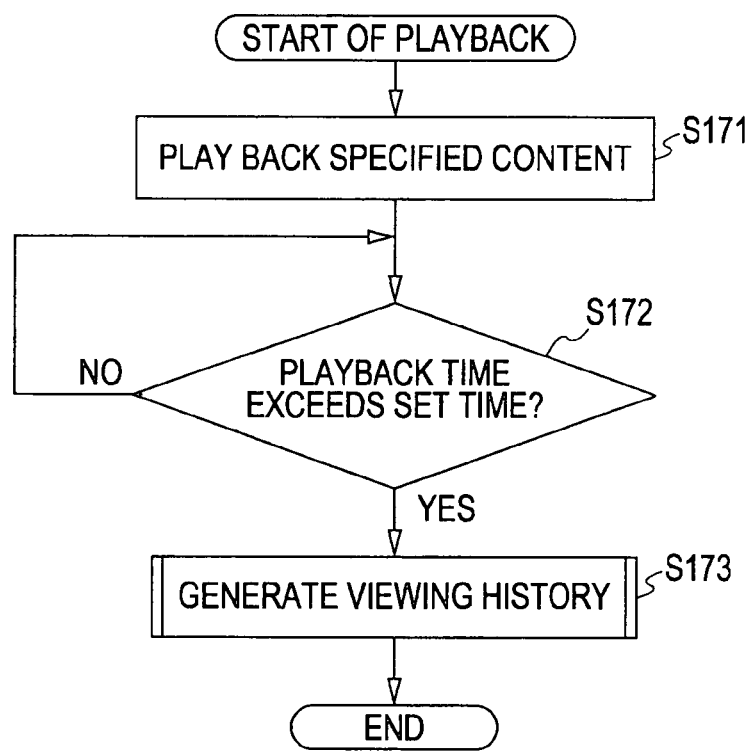
FIG. 9 is a flowchart showing another example of the playback process.

FIG. 9 is a flowchart showing an example of the playback process performed by the recording-playback apparatus 11.

In Step S171, the playback control unit 26 starts playback of the specified content in response to a signal instructing the playback of the content supplied from the input unit 21. Specifically, the playback control unit 26 acquires content data concerning the specified content from the content recording unit 25 and decompresses the acquired content data in a predetermined format. The playback control unit 26 supplies the decompressed content data to the display device connected to the recording-playback apparatus 11 and displays the content in the display device.

In Step S172, the playback control unit 26 determines whether the playback time of the content exceeds a set time. The playback time means a time elapsed since the playback of the content has been started. The set time means a predetermined time, such as 30 minutes, or means a time occupying a predetermined proportion of the entire playback time, for example, a time corresponding to 50% of the entire playback time of the content.

If the playback control unit 26 determines in Step S172 that the playback time of the content does not exceed the set time, the process goes back to Step S172 to repeat the determination step. If the playback control unit 26 determines in Step S172 that the playback time of the content exceeds the set time, the process goes to Step S173.

In Step S173, the recording-playback apparatus 11 performs the viewing history generating process and the playback process is terminated. The viewing history generating process is similar to the one described above with reference to FIG. 6. The recording-playback apparatus 11 generates the viewing history of the content that was played back and records the generated viewing history.

The recording-playback apparatus 11 generates the viewing history of the content being played back in the manner described above if the playback time of the content being played back exceeds the set time.

As described above, the generation of the viewing history of the content if the playback time of the content being played back exceeds the set time allows the viewing history to be generated even if the user does not instruct the generation of the viewing history while viewing the content. Since only the viewing history of the content the playback time of which exceeds the set time is generated, it is possible to suppress the viewing history of the content which the user does not want from being generated. This applies to a case in which the user stops to view the content at some midpoint because the user is not interested in the content.

The user may instruct the generation of the viewing history introducing the content after the user finishes viewing the content. In such a case, for example, the user operates the remote commander to display a list of the pieces of content which the user viewed in the display device, selects a piece of content the viewing history of which is to be generated from the list, and operates the remote commander so as to generate the viewing history of the selected piece of content. The remote commander transmits a command corresponding to the user's operation to the input unit 21, which is the receiving unit.

The input unit 21 receives the command from the remote commander and supplies a signal instructing generation of the viewing history of the piece of content selected by the user to the viewing history generating unit 27 in response to the received command. The viewing history generating unit 27 performs a process similar to the viewing history generating process described above with reference to FIG. 6 in response to the signal instructing the generation of the viewing history of the piece of content selected by the user, supplied from the input unit 21, to generate the viewing history of the piece of content.

The recording-playback apparatus 11 may have a server function to allow the user to view the viewing history by using another apparatus connected to the recording-playback apparatus 11 via a communication network, such as the Internet or a local area network (LAN).

Figure 10:
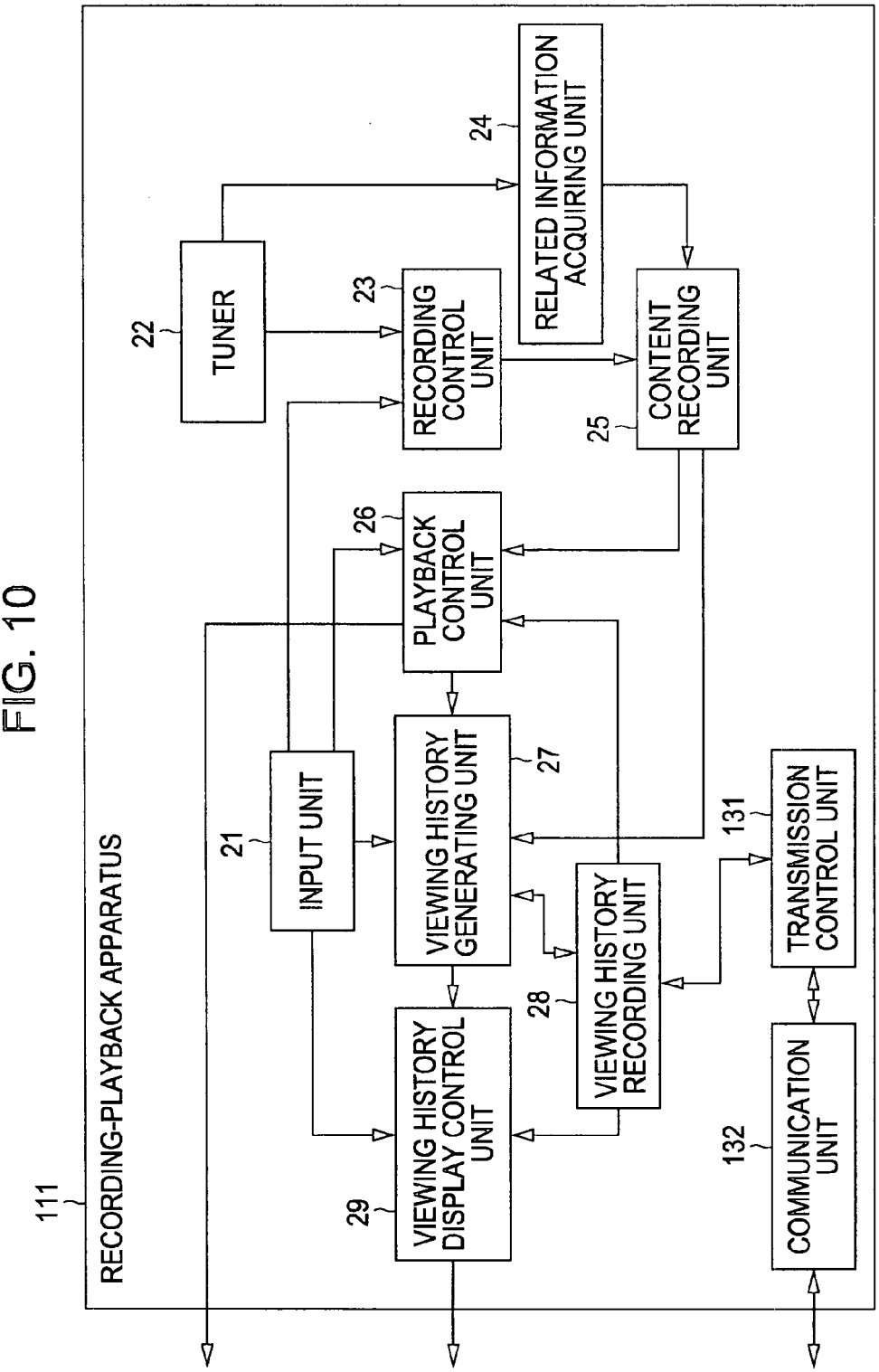
FIG. 10 is a block diagram showing an example of the configuration of a recording-playback apparatus according to another embodiment of the present invention.

In such a case, the recording-playback apparatus 11 has a configuration shown in FIG. 10. FIG. 10 is a block diagram showing an example of the configuration of a recording-playback apparatus according to another embodiment of the present invention. The same reference numerals are used in FIG. 10 to identify the same components shown in FIG. 1. A detailed description of such components is omitted herein.

A recording-playback apparatus 111 shown in FIG. 10 includes the input unit 21 and the viewing history display control unit 29, like the recording-playback apparatus 11 shown in FIG. 1. The recording-playback apparatus 111 differs from the recording-playback apparatus 11 shown in FIG. 1 in that the recording-playback apparatus 111 includes a transmission control unit 131 and a communication unit 132.

The transmission control unit 131 controls transmission of the viewing history data to another apparatus connected to the recording-playback apparatus 111. Specifically, when the transmission control unit 131 receives a transmission request requesting the transmission of the viewing history from the communication unit 132, the transmission control unit 131 acquires viewing history data concerning the requested viewing history from the viewing history recording unit 28 in response to the transmission request and supplies the acquired viewing history data to the communication unit 132.

The communication unit 132 communicates with the other apparatus connected to the recording-playback apparatus 111 via the communication network. Specifically, the communication unit 132 receives a transmission request from the other apparatus and supplies the received transmission request to the transmission control unit 131. The communication unit 132 transmits the viewing history data supplied from the transmission control unit 131 to the other apparatus via the communication network.

Figure 11:
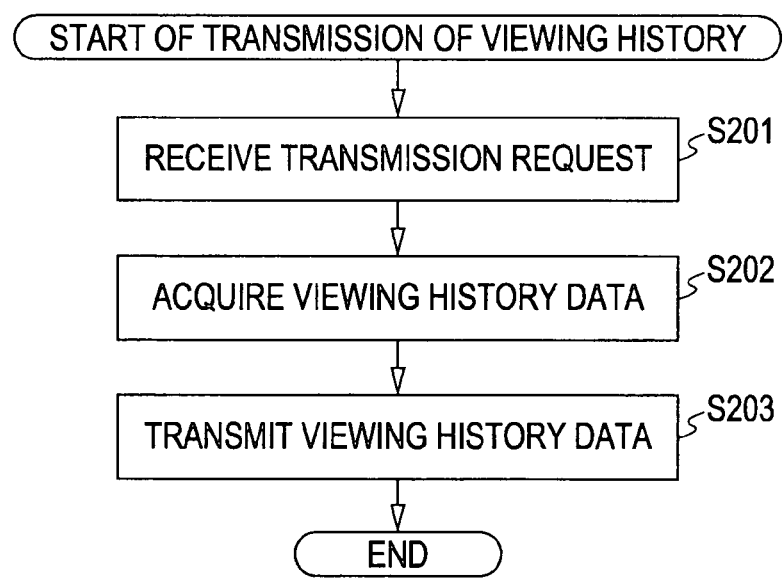
FIG. 11 is a flowchart showing an example of a viewing history transmitting process.

FIG. 11 is a flowchart showing an example of a viewing history transmitting process in which the recording-playback apparatus 111 in FIG. 10 transmits viewing history data in response to a request from the other apparatus connected to the recording-playback apparatus 111 via the communication network.

The viewing history transmitting process is started when the recording-playback apparatus 111 receives a transmission request requesting transmission of a viewing history from the other apparatus connected to the recording-playback apparatus 111.

In Step S201, the communication unit 132 receives the transmission request from the other apparatus via the communication network and supplies the received transmission request to the transmission control unit 131. In Step S202, the transmission control unit 131 acquires viewing history data concerning the viewing history requested in the transmission request supplied from the communication unit 132 from the viewing history recording unit 28. The transmission control unit 131 supplies the acquired viewing history data to the communication unit 132.

In Step S203, the communication unit 132 transmits the viewing history data supplied from the transmission control unit 131 to the other apparatus connected to the recording-playback apparatus 111 via the communication network and the viewing history transmitting process is terminated.

The recording-playback apparatus 111 transmits the viewing history data concerning the requested viewing history to the other apparatus connected to the recording-playback apparatus 111 via the communication network in the manner described above.

As described above, the transmission of the viewing history data to the other apparatus connected to the recording-playback apparatus via the communication network allows the user to view the viewing history by using the other apparatus.

The recording-playback apparatus 11 may have an uploading function to allow the user to post the viewing history to a server connected to the recording-playback apparatus 11 via a communication network, such as the Internet.

In such a case, the recording-playback apparatus 11 has a configuration shown in FIG. 12. FIG. 12 is a block diagram showing an example of the configuration of a recording-playback apparatus according to another embodiment of the present invention. The same reference numerals are used in FIG. 12 to identify the same components shown in FIG. 1. A detailed description of such components is omitted herein.

A recording-playback apparatus 112 shown in FIG. 12 includes the input unit 21 and the viewing history display control unit 29, like the recording-playback apparatus 11 shown in FIG. 1. The recording-playback apparatus 112 differs from the recording-playback apparatus 11 shown in FIG. 1 in that the recording-playback apparatus 112 includes a message generating unit 161 and a communication unit 162.

The message generating unit 161 generates a request message requesting uploading of viewing history data concerning the viewing history displayed at a predetermined position in a Web page to the server connected to the recording-playback apparatus 112 via the communication network and supplies the generated request message to the communication unit 162. The request message means a signal requesting the uploading of the viewing history data and includes the viewing history data to be uploaded and so on.

The communication unit 162 communicates with the server connected to the recording-playback apparatus 112 via the communication network. For example, the communication unit 162 transmits the request message supplied from the message generating unit 161 to the server via the communication network.

Figure 13:
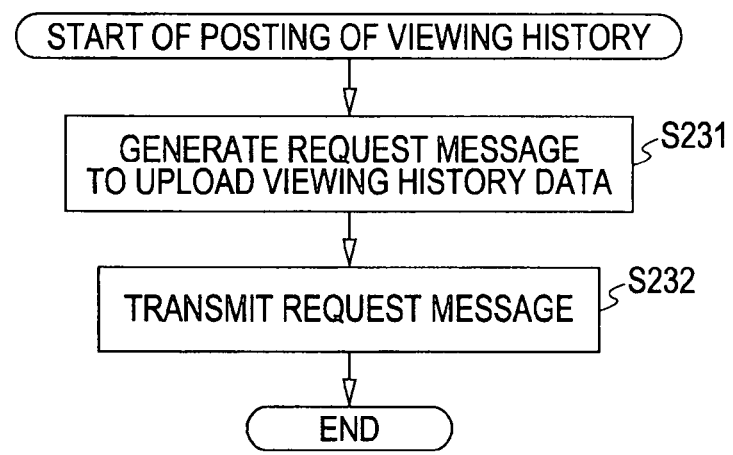
FIG. 13 is a flowchart showing an example of a posting process.

FIG. 13 is a flowchart showing an example of a posting process in which the recording-playback apparatus 112 in FIG. 12 posts a viewing history to the server connected to the recording-playback apparatus 112 via the communication network.

The posting process is started when a signal instructing posting of a viewing history is supplied from the input unit 21 to the message generating unit 161 in response to a user's operation.

In Step S231, the message generating unit 161 generates a request message to upload viewing history data in response to the signal supplied from the input unit 21. For example, the message generating unit 161 acquires viewing history data concerning the viewing history the posting of which is instructed from the viewing history recording unit 28 and generates a request message that includes the acquired viewing history data and that is in a format, such as AtomAPI, supplied from the server. The message generating unit 161 supplies the generated request message to the communication unit 162.

The request message may include digest moving image data concerning digest moving images associated with the viewing history displayed on the basis of the viewing history data, if necessary, in addition to the viewing history data.

In Step S232, the communication unit 162 transmits the request message supplied from the message generating unit 161 to the server connected to the recording-playback apparatus 112 via the communication network and the posting process is terminated. Since the viewing history data included in the request message is recorded in the server, another apparatus connected to the server can receive the viewing history data from the server to display the viewing history. In other words, the uploading of the viewing history data to the server allows the viewing history to be opened as a Web page, so that other users can view the viewing history.

The recording-playback apparatus 112 generates the request message including the viewing history data and transmits the generated request message to the server connected to the recording-playback apparatus 112 via the communication network in the manner described above.

As described above, the generation of the request message including the viewing history data and the transmission of the request message to the server connected to the recording-playback apparatus 112 via the communication network allow the user to view the viewing history by using another apparatus that is accessible to the server. Since the viewing history introducing the content is opened, the user can communicate with other users via the content.

The TV broadcast program is exemplified as the content the viewing history of which is to be generated in the above description. However, the content the viewing history of which is to be generated may be a moving image delivered via the Internet or the like, a commercial film included in the program, or a moving image captured by a digital video camera.

The series of processing described above may be performed by hardware or may be performed by software. When the series of processing is performed by software, programs constituting the software are installed from a recording medium to a computer incorporated in dedicated hardware or to, for example, a general-purpose personal computer capable of performing various functions by using the installed programs.

Figure 14:
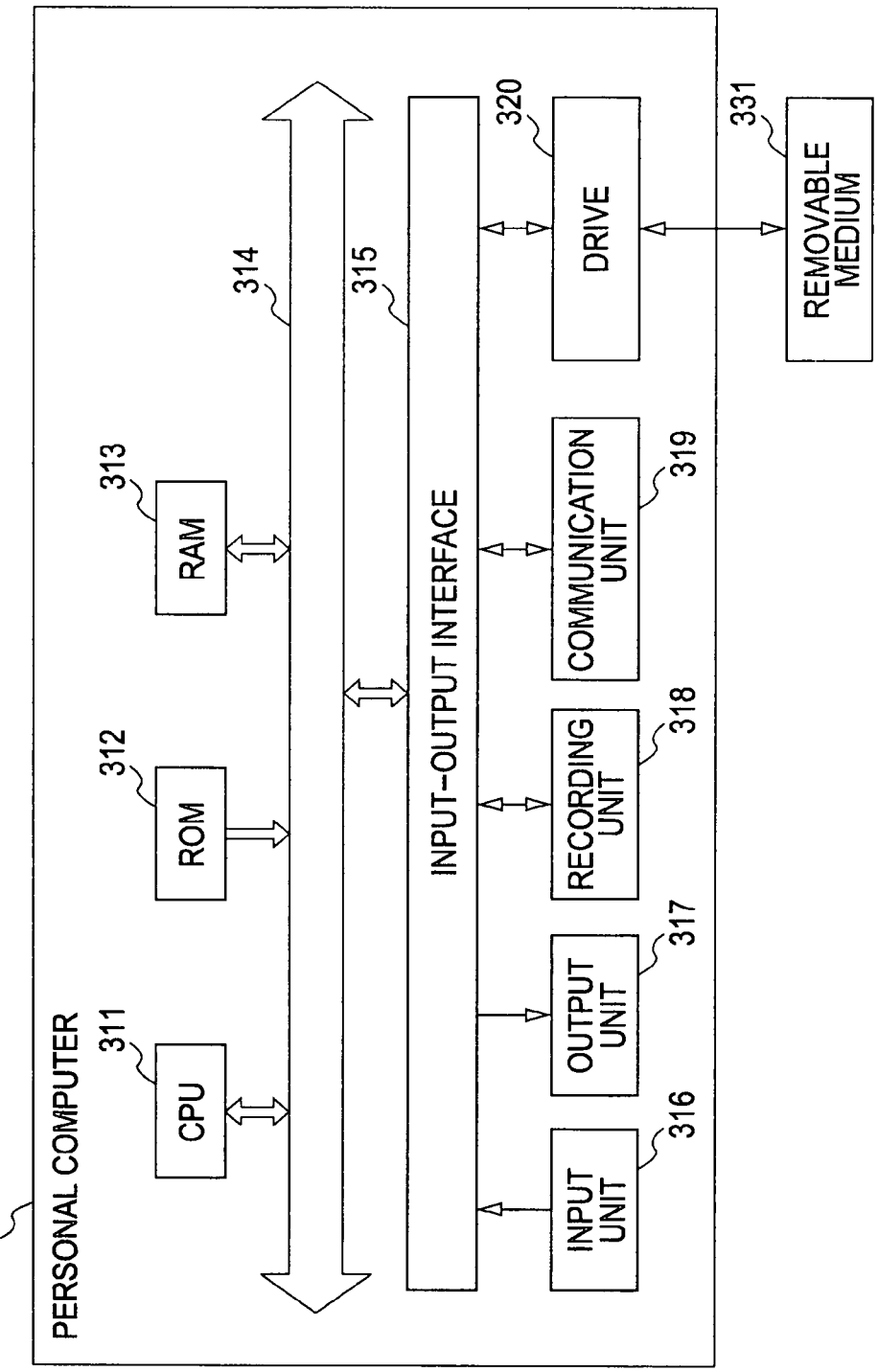
FIG. 14 is a block diagram showing an example of the configuration of a personal computer.

FIG. 14 is a block diagram showing an example of the configuration of a personal computer 301 executing the series of processing described above by using programs. Referring to FIG. 14, a central processing unit (CPU) 311 in the personal computer 301 performs a variety of processing in accordance with the programs recorded in a read only memory (ROM) 312 or a recording unit 318. A random access memory (RAM) 313 has the programs executed by the CPU 311 and data stored therein. The CPU 311, the ROM 312, and the RAM 313 are connected to each other via a bus 314.

An input-output interface 315 is connected to the CPU 311 via the bus 314. An input unit 316 including a keyboard, a mouse, and a microphone and an output unit 317 including a display and a speaker are connected to the input-output interface 315. The CPU 311 performs the variety of processing in response to an instruction input with the input unit 316. The CPU 311 supplies the result of the processing to the output unit 317.

The recording unit 318 connected to the input-output interface 315 is, for example, a hard disk. The recording unit 318 records the programs executed by the CPU 311 and a variety of data. A communication unit 319 communicates with external devices via a network, such as the Internet or a LAN.

Programs may be acquired via the communication unit 319 and the acquired programs may be recorded in the recording unit 318.

A drive 320 connected to the input-output interface 315 drives a removable medium 331, such as a magnetic disk, an optical disk, a magneto-optical disk, or a semiconductor memory, loaded in the drive 320 to acquire programs and data recorded in the removable medium 331. The acquired programs and data are transferred to the recording unit 318, if necessary, and are recorded in the recording unit 318.

The recording medium storing the programs that can be executed by the computer and that are installed in the computer is, for example, the removable medium 331, which is a package medium including a magnetic disk (including a flexible disk), an optical disk (including a compact disc-read only memory (CD-ROM) and a digital versatile disk (DVD)), a magneto-optical disk, or a semiconductor memory, the ROM 312 temporarily or permanently storing the programs, or the hard disk constituting the recording unit 318, as shown in FIG. 14. The programs are stored in the recording medium through the communication unit 319, which is an interface such as a router or a modem, over a wired or wireless communication medium, such as a LAN, the Internet, or digital satellite broadcasting.

The steps describing the programs stored in the recording medium may be performed in time series in the described order or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    recording means for recording content, the content comprising media content, the media content comprising audio content and/or video content;
    playback controlling means for controlling playback of the content; and
    viewing history generating means for generating viewing history data used for displaying a viewing history of the content, information concerning the content, a title identifying the content, and an image relating to the content being displayed in the viewing history, wherein generating the viewing history data comprises:
        evaluating the media content to identify a portion of the media content satisfying at least one criterion;
        extracting the portion from the media content;
        storing the portion of the media content as a part of the viewing history data for the content;
        determining at least one keyword related to the content from the information concerning the content and/or the title identifying the content;
        identifying, based at least in part on the at least one keyword, at least one second content comprising second media content; and
        storing at least one identifier for the at least one second content.

2. The information processing apparatus according to claim 1, further comprising:
    retrieving means for retrieving at least one viewing history meeting a predetermined condition from among a plurality of other viewing histories,
    wherein the viewing history generating means identifies the at least one second content at least in part through the retrieving means retrieving at least one viewing history meeting that includes the at least one keyword.

3. The information processing apparatus according to claim 1, wherein:
    the viewing history generating means stores the at least one identifier for the at least one second content as a part of the viewing history; and
    the information processing apparatus further comprises:
        updating means for updating the at least one identifier stored in the viewing history, the updating comprising:
            identifying at least one third content based at least in part on the at least one keyword, and
            in response to determining that the at least one third content includes a third content not included in the at least one second content, storing an identifier for the third content as a part of the viewing history.

4. The information processing apparatus according to claim 1, further comprising:
    digest moving image generating means for recompressing moving image data used for playing back a predetermined segment of the content to generate a digest moving image of the content,
    wherein an image that is displayed in the viewing history and that relates to the content is a thumbnail image indicating the digest moving image.

5. The information processing apparatus according to claim 4,
    wherein the predetermined segment is a segment that starts at the beginning of a certain scene included in the content and that has a predetermined length.

6. The information processing apparatus according to claim 4, wherein the viewing history generating means interacts with the digest moving image generating means to identify the portion of the media content and extract the portion from the media content, wherein the digest moving image forms at least a part of the portion of the media content.

7. The information processing apparatus according to claim 1, further comprising:
comment creating means for creating a comment of a user about the content by combining a first word associated with the content with a second word representing an impression about the content, the words being selected by the user,
wherein the viewing history generating means generates the viewing history data so as to display the comment in the viewing history.

8. The information processing apparatus according to claim 1, further comprising:
uploading means for uploading the generated viewing history data to another apparatus connected to the information processing apparatus via a communication network as data used for displaying the viewing history at a predetermined position in a Web page.

9. The information processing apparatus according to claim 1, wherein storing the portion of the media content as a part of the viewing history data for the content comprises:
storing the portion of the media content; and
storing a reference to the portion of the media content as the part of the viewing history data for the content.

10. The information processing apparatus according to claim 1, wherein the viewing history generating means generates the viewing history data in response to a user instruction to generate the viewing history data for the content.

11. The information processing apparatus according to claim 1, wherein the viewing history generating means generates the viewing history data in response to receiving, following the playback controlling means controlling a playback of at least a portion of the content, a user instruction to generate the viewing history data for the content.

12. The information processing apparatus according to claim 1, wherein the viewing history generating means generates the viewing history data in response to receiving, following the playback controlling means controlling a playback of at least a portion of the content, a signal indicating that the viewing history data is to be generated.

13. The information processing apparatus according to claim 12, wherein the viewing history generating means generates the viewing history data in response to receiving, following the playback controlling means controlling a playback of at least a predetermined amount of the content, a signal indicating that the viewing history data is to be generated.

14. An information processing method comprising:
controlling recording of content, the content comprising media content, the media content comprising audio content and/or video content;
controlling playback of the content; and
generating viewing history data used for displaying a viewing history of the content, information concerning the content, a title identifying the content, and an image relating to the content being displayed in the viewing history, wherein generating the viewing history data comprises:
evaluating the media content to identify a portion of the media content satisfying at least one criterion,
extracting the portion from the media content,
storing the portion of the media content as part of the viewing history data for the content,
determining at least one keyword related to the content from the information concerning the content and/or the title identifying the content,
identifying, based at least in part on the at least one keyword, at least one second content comprising second media content, and
storing at least one identifier for the at least one second content.

15. A storage medium having encoded thereon a program that, when executed by a computer, causes the computer to carry out a method comprising:
controlling recording of content, the content comprising media content, the media content comprising audio content and/or video content;
controlling playback of the content; and
generating viewing history data used for displaying a viewing history of the content, information concerning the content, a title identifying the content, and an image relating to the content being displayed in the viewing history, wherein generating the viewing history data comprises:
evaluating the media content to identify a portion of the media content satisfying at least one criterion,
extracting the portion from the media content,
storing the portion of the media content as part of the viewing history data for the content;
determining at least one keyword related to the content from the information concerning the content and/or the title identifying the content,
identifying, based at least in part on the at least one keyword, at least one second content comprising second media content, and
storing at least one identifier for the at least one second content.

16. An information processing apparatus comprising:
a recording unit that records content, the content comprising media content, the media content comprising audio content and/or video content;
a playback controlling unit that controls playback of the content; and
a viewing history generating unit to generate viewing history data used for displaying a viewing history of the content, information concerning the content, a title identifying the content, and an image relating to the content being displayed in the viewing history, wherein generating the view history data comprises:
evaluating the media content to identify a portion of the media content satisfying at least one criterion,
extracting the portion from the media content,
storing the portion of the media content as a part of the viewing history data for the content,
determining at least one keyword related to the content from the information concerning the content and/or the title identifying the content,
identifying, based at least in part on the at least one keyword, at least one second content comprising second media content, and
storing at least one identifier for the at least one second content.

* * * * *